US 8,548,659 B2
Oct. 1, 2013

(12) United States Patent
Tanaka

(10) Patent No.: US 8,548,659 B2
(45) Date of Patent: Oct. 1, 2013

(54) VEHICLE AND SYSTEM FOR CHARGING THE SAME

(75) Inventor: Masahide Tanaka, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 244 days.

(21) Appl. No.: 12/867,163

(22) PCT Filed: Feb. 18, 2009

(86) PCT No.: PCT/JP2009/052760
§ 371 (c)(1),
(2), (4) Date: Aug. 11, 2010

(87) PCT Pub. No.: WO2009/104634
PCT Pub. Date: Aug. 27, 2009

(65) Prior Publication Data
US 2011/0000726 A1  Jan. 6, 2011

(30) Foreign Application Priority Data

Feb. 18, 2008 (JP) ................. 2008-036579
Feb. 19, 2008 (JP) ................. 2008-037818
Mar. 5, 2008 (JP) ................. 2008-055292
Dec. 22, 2008 (JP) ................. 2008-324987
Dec. 24, 2008 (JP) ................. 2008-327791
Jan. 15, 2009 (JP) ................. 2009-006499

(51) Int. Cl.
B60L 9/00 (2006.01)

(52) U.S. Cl.
USPC ....... 701/22; 701/123; 180/65.1; 180/65.265; 320/109

(58) Field of Classification Search
USPC .................. 701/22, 123; 180/65.1, 65.265; 320/109
See application file for complete search history.

(56) References Cited

U.S. PATENT DOCUMENTS

| 5,650,710 A | 7/1997 | Hotta |
| 6,150,794 A | 11/2000 | Yamada et al. |
| 2004/0008109 A1 | 1/2004 | Endoh |
| 2007/0029121 A1* | 2/2007 | Saitou et al. ............... 180/65.2 |
| 2007/0144605 A1 | 6/2007 | Horowitz et al. |
| 2007/0298313 A1 | 12/2007 | Iida |
| 2008/0252257 A1 | 10/2008 | Sufrin-Disler et al. |
| 2009/0096416 A1 | 4/2009 | Tonegawa et al. |
| 2009/0315512 A1 | 12/2009 | Ichikawa et al. |

FOREIGN PATENT DOCUMENTS

| CN | 1985121 A | 6/2007 |
| JP | 6-231361 | 8/1994 |
| JP | 07-004095 | 1/1995 |

(Continued)

Primary Examiner — Gertrude Arthur Jeanglaude
(74) Attorney, Agent, or Firm — Fish & Richardson P.C.

(57) ABSTRACT

Provided is a practical plug-in hybrid vehicle or an electric vehicle as well as a charge system, a fuel consumption measurement system, and an environment protection system for the vehicles. The charge system includes an electric power source charging a vehicle having a battery, a power supply unit for supplying electric power from the electric power source to the vehicle, and a power cable communication unit for performing power cable communication concerning the vehicle and the charging via the power supply unit. The vehicle includes a fuel tank for receiving oil from outside, a storage unit for storing oil supply information, a power source which consumes the fuel in the fuel tank and provides a travel power, a travel distance information acquisition unit, and a control unit which automatically calculates the fuel consumption according to the oil supply information in the storage unit and the travel distance information in the travel distance acquisition unit.

11 Claims, 19 Drawing Sheets

(56) References Cited

FOREIGN PATENT DOCUMENTS

| | | |
|---|---|---|
| JP | 08-214412 | 8/1996 |
| JP | 10-4638 | 1/1998 |
| JP | 10-75535 | 3/1998 |
| JP | 10-262304 | 9/1998 |
| JP | 2000-224770 | 11/2000 |
| JP | 2001-78304 | 3/2001 |
| JP | 2001-108503 | 4/2001 |
| JP | 2002-227710 | 8/2002 |
| JP | 2003-189411 | 7/2003 |
| JP | 2004-045180 | 2/2004 |
| JP | 2004-189144 | 7/2004 |
| JP | 2005-335627 | 12/2005 |
| JP | 2006-178861 | 7/2006 |
| JP | 2006-331405 | 12/2006 |
| JP | 2007-68340 | 3/2007 |
| JP | 2007-228695 | 6/2007 |
| JP | 3965980 | 6/2007 |
| JP | 2007-185083 | 7/2007 |
| JP | 2007-207140 | 8/2007 |
| JP | 2008-35665 | 2/2008 |
| JP | 2008-043404 | 2/2008 |
| JP | 2008-189121 | 8/2008 |
| JP | 2008-537528 | 9/2008 |
| JP | 20008-538408 | 10/2008 |
| JP | 2008-278740 | 11/2008 |
| JP | 2008-284952 | 11/2008 |
| JP | 2009-124611 | 4/2009 |
| WO | WO 2006/006715 | 1/2006 |
| WO | WO 2007/070248 | 6/2007 |
| WO | WO 2008/015886 | 2/2008 |
| WO | 2009/103634 | 2/2009 |
| WO | 2009/104634 | 8/2009 |

* cited by examiner

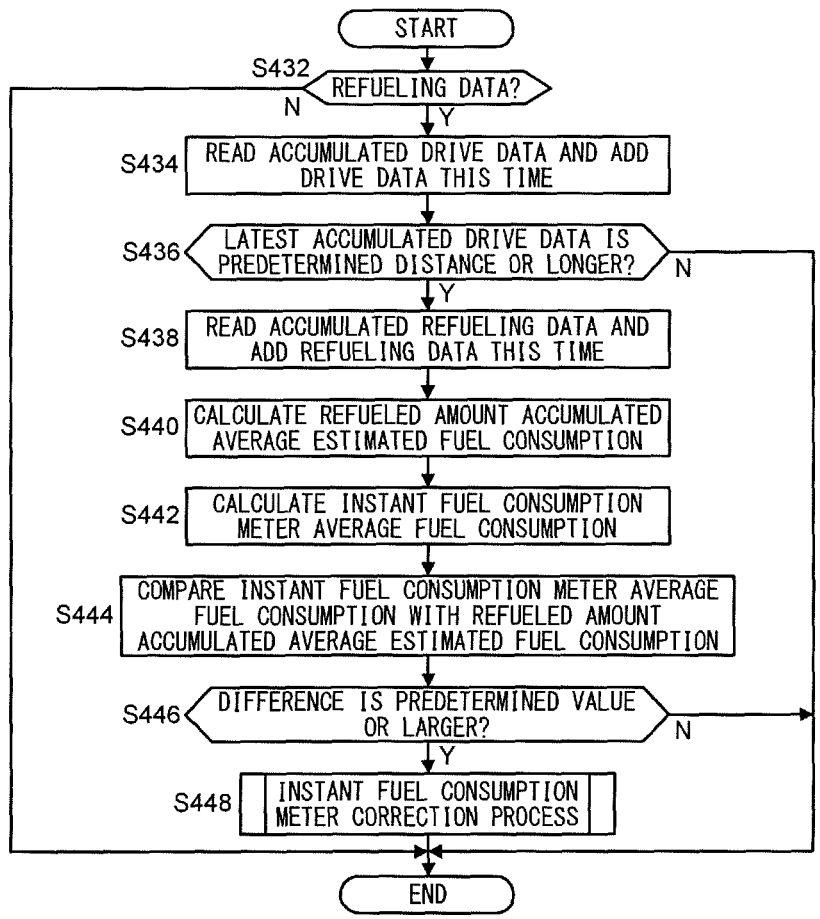

VEHICLE AND SYSTEM FOR CHARGING THE SAME

TECHNICAL FIELD

The present invention relates to a vehicle and a charge system for the same.

BACKGROUND ART

Recent years, electric vehicles and plug-in hybrid vehicles are in a studying stage for a practical use.

Further, as examples of conventional technology about a charge system of a vehicle, there are Patent Documents 1 and 2.

In addition, as examples of conventional technology about a fuel consumption measurement system of a vehicle, there are Patent Documents 3 to 5.

In addition, as examples of conventional technology about an environment protection system of a vehicle, there are Patent Documents 6 to 8.

In addition, as other examples of conventional technology about a charge system of a vehicle, there are Patent Documents 9 and 10.

Patent Document 1: JP-A-7-4095
Patent Document 2: JP-A-10-262304
Patent Document 3: JP-A-2001-108503
Patent Document 4. JP-A-2002-227710
Patent Document 5: JP-A-2004-45180
Patent Document 6: JP-A-2001-78304
Patent Document 7: JP-A-2007-185083
Patent Document 8: JP-A-2007-207140
Patent Document 9: JP-A-2008-189121
Patent Document 10: JP-A-2008-537528

DISCLOSURE OF THE INVENTION

Problem to be Solved by the Invention

However, in order to provide a practical charge system so that electric vehicles and plug-in hybrid vehicles become widespread, there are still many problems that remain to be solved.

In view of the above-mentioned problems, it is an object of the present invention to provide a charge system for a vehicle that can be actually used, so as to encourage widespread use of vehicles using electricity.

Means for Solving the Problem

A charge system for a vehicle according to the present invention includes an electric power source which charges a vehicle having a battery, a power supply unit which leads electric power from the electric power source to the vehicle, and a power cable communication unit which performs power cable communication with the vehicle about the charging via the power supply unit (first configuration).

In addition, preferably, the charge system for a vehicle having the above-mentioned first configuration includes a power supply switching unit which determines whether or not to supply electric power from the electric power source to the power supply unit, in which the power supply switching unit is controlled in accordance with communication by the power cable communication unit with the vehicle (second configuration).

In addition, preferably, in the charge system for a vehicle having the above-mentioned second configuration, the power supply switching unit enables the power cable communication unit to communicate with the vehicle regardless of whether or not electric power is supplied to the power supply unit (third configuration).

In addition, preferably, in the charge system for a vehicle having the above-mentioned second configuration, the power supply switching unit suspends starting of the power supply until a predetermined time slot comes even if the power supply unit is in a state capable of charging the vehicle (fourth configuration).

In addition, preferably, the charge system for a vehicle having the above-mentioned first configuration includes a decision unit which decides that the power supply unit is left in an abnormal state that is not a vehicle charging state (fifth configuration).

In addition, preferably, in the charge system for a vehicle having the above-mentioned first configuration, the power cable communication unit transmits power supply information to the vehicle via the power supply unit (sixth configuration).

In addition, preferably, in the charge system for a vehicle having the above-mentioned first configuration, the power cable communication unit transmits information for payment of electric fee bill to the vehicle (seventh configuration).

In addition, preferably, the charge system for a vehicle having the above-mentioned first configuration further includes a fuel storage which supplies fuel to a vehicle having a fuel tank, and a fuel supply unit which leads fuel from the fuel storage to the vehicle (eighth configuration).

In addition, preferably, in the charge system for a vehicle having the above-mentioned eighth configuration, the power cable communication unit transmits oil supply information to the vehicle via the power supply unit, for fuel consumption calculation (ninth configuration).

In addition, preferably, the charge system for a vehicle having the above-mentioned eighth configuration includes a refueling preparation detection unit which detects whether or not the fuel supply unit is in a refueling preparation state, a power supply preparation detection unit which detects whether or not the power supply unit is in a power supply preparation state, and a controller which changes power supply situation to the vehicle when the power supply preparation detection unit detects the power supply preparation state depending on whether or not the refueling preparation detection unit detects the refueling preparation state (tenth configuration).

In addition, preferably, the charge system for a vehicle having the above-mentioned eighth configuration includes an abnormal detection unit which detects an abnormal state of the power supply unit, and a controller which disables the fuel supply unit to supply fuel when the abnormal detection unit detects an abnormal state of the power supply unit (eleventh configuration).

In addition, preferably, in the charge system for a vehicle having the above-mentioned eleventh configuration, the power supply unit and the fuel supply unit are structured as an integrated cable (twelfth configuration).

In addition, a vehicle according to the present invention includes an electric power accumulation unit, a charging channel which is connected to an external power supply unit and leads electric power to the electric power accumulation unit, and a power cable communication unit which performs power cable communication externally about the charging via the charging channel (thirteenth configuration).

Note that the vehicle having the above-mentioned thirteenth configuration preferably includes a power supply preparation detection unit which detects a power supply preparation state to the electric power accumulation unit via the charging channel, a drive start operation unit, and a drive controller which disables an operation of the drive start operation unit when the power supply preparation detection unit detects the power supply preparation state (fourteenth configuration).

In addition, preferably, the vehicle having the above-mentioned thirteenth configuration further includes a fuel tank which receives refueling from the outside, a detection unit which detects an electric power accumulated state of the electric power accumulation unit, a first power source which consumes fuel in the fuel tank so as to generate drive power, a second power source which consumes electric power in the electric power accumulation unit so as to generate drive power, and a controller which is capable of selecting between a first mode in which switching from the second power source to the first power source is performed on the basis of a first detection level of the detection unit and a second mode in which switching from the second power source to the first power source is performed on the basis of a second detection level of the detection unit that is different from the first detection level (fifteenth configuration).

In addition, preferably, in the vehicle having the above-mentioned fifteenth configuration, the second detection level is a level for sustaining the state where the electric power accumulation unit is sufficiently charged, and the first detection level is a level that the second power source can be used for the drive when drive efficiency of the drive using a first power source is a predetermined value or lower (sixteenth configuration).

In addition, a vehicle according to the present invention includes a storage unit which stores oil supply information, a power source which consumes fuel in the fuel tank so as to provide travel power, a travel distance information acquisition unit, and a controller which calculates fuel consumption automatically on the basis of the oil supply information stored in the storage unit and travel distance information in the travel distance acquisition unit (seventeenth configuration).

Note that in the vehicle having the above-mentioned seventeenth configuration, preferably, the controller calculates the fuel consumption automatically from a refueling amount this time and travel distance information from refueling the last time to refueling this time on the oil supply information stored in the storage unit if both the refueling the last time and the refueling this time to the fuel tank were performed to fill up, and the controller does not calculate the fuel consumption automatically on the basis of the refueled amount and the travel distance information if at least one of the refueling the last time and the refueling this time to the fuel tank is not performed to fill up (eighteenth configuration).

In addition, preferably, in the vehicle having the above-mentioned seventeenth configuration, the controller calculates the fuel consumption on the basis of an accumulated refueled amount stored in the storage unit and accumulated travel distance information obtained from the travel distance information acquisition unit, if it is decided that the accumulated refueled amount stored in the storage unit is sufficiently larger than the capacity of the fuel tank (nineteenth configuration).

In addition, preferably, the vehicle having the above-mentioned seventeenth configuration includes an instant fuel consumption meter which calculates instant fuel consumption under driving by detecting fuel supply situation from the fuel tank to the engine unit, and a correction unit which corrects the instant fuel consumption meter on the basis of the fuel consumption calculated by the controller (twelfth configuration).

Effects of the Invention

According to the present invention, a practical charge system for a vehicle can be provided, and vehicles using electricity can be widely available.

BRIEF DESCRIPTION OF THE DRAWINGS

FIG. 19 is a flowchart illustrating details of Step S344 in FIG. 16.

Figure 1:
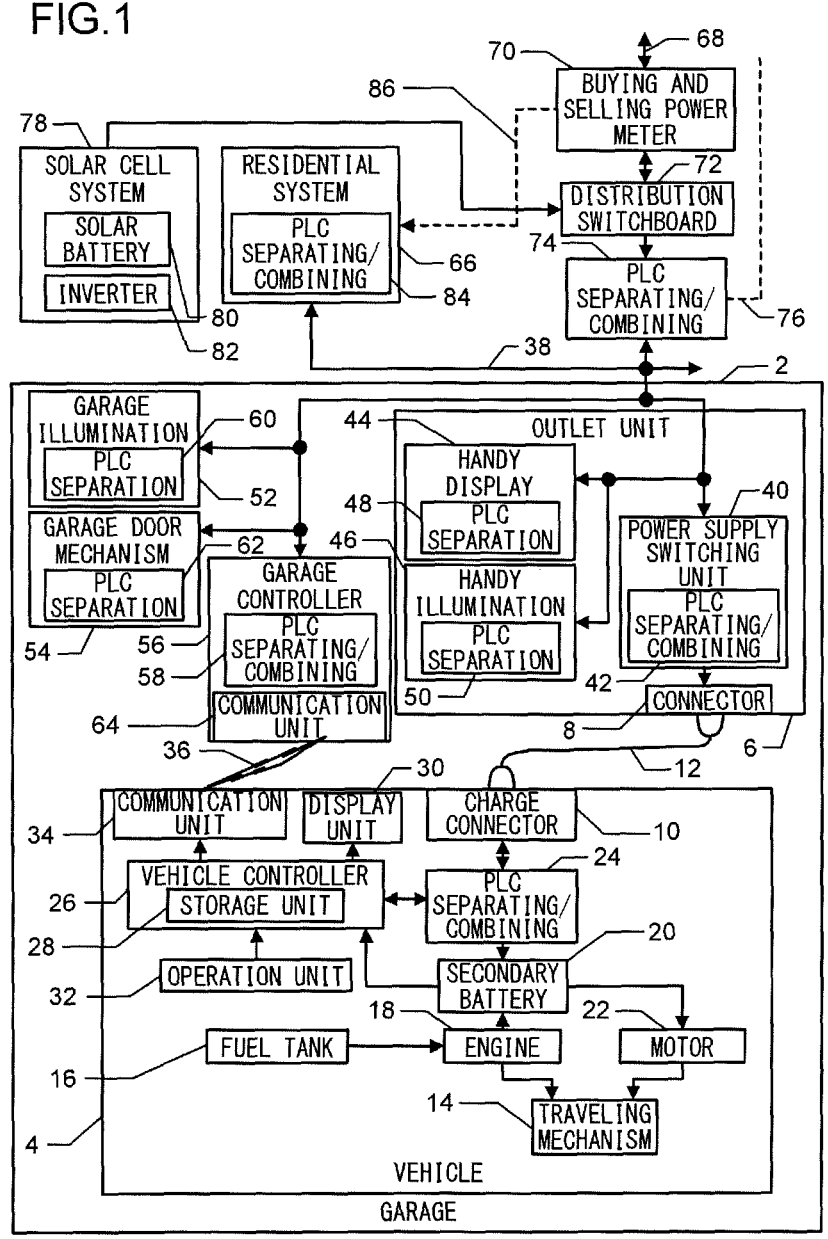
FIG. 1 is a block diagram illustrating Example 1 of a vehicle charge system according to an embodiment of the present invention.

EXPLANATION OF NUMERALS 8 connector (power supply unit)
10 charge connector (trade information acquisition unit, electric power supplying preparation detection unit)
12 charge cable (electric power line, external cable, electric power supply channel)
16 fuel tank (energy accumulation unit)
18 engine (engine unit, first power source)
20 secondary battery (electric power accumulation unit, energy accumulation unit)
22 motor (engine unit, second power source)
24 PLC separating/combining unit (reception unit, power cable communication unit)

26 vehicle controller (controller, conversion unit, trade information acquisition unit, refueling preparation detection unit, electric power supplying preparation detection unit, drive controller, electric power accumulated state detection unit)
28 storage unit (trade information acquisition unit)
30 display unit (alarm unit)
32 operation unit (drive start operation unit)
34 communication unit (reception unit, wireless communication unit, trade information acquisition unit)
38 electric power line
40 power supply switching unit (power supply unit)
44, 208 display unit
46 handy illumination unit
52 garage illumination unit (illumination unit)
54 garage door mechanism (storage mechanism)
64 communication unit
68 service wire
78 solar cell system (private power generation system)
84 separating/combining unit
108 first outside line
110 second outside line
112 neutral line
114 controlling computer (controller, notifying unit, detection unit)
502 charge meter (measurement unit)
506, 808, 814 outlet unit (charge unit)
508, 822 connector
538 electric power line (electric power input unit)
540, 816 power supply switching unit
542 separating/combining unit (communication unit)
702, 712, 806, 812 wheel stopper
604, 824 power supply controlling computer (controller)
706, 716 cap (protection unit)
708, 718 connector/cap mechanical sensor (detection unit)
902 service stand
908 refueling inlet (refueling preparation detection unit)
912 refueling tube (fuel supply channel)
913 breakage sensor (abnormal detection unit)
922 service stand controller (abnormal detection unit, charge system controller)
916 instant fuel consumption meter
917 trip meter (travel distance information acquisition unit)

BEST MODE FOR CARRYING OUT THE INVENTION

FIG. 1 is a block diagram illustrating Example 1 of a vehicle charge system according to an embodiment of the present invention. A garage 2 can house a plug-in hybrid type vehicle 4 and is equipped with an outlet unit 6. A connector 8 of the outlet unit 6 and a charge connector 10 of the vehicle 4 can be connected with each other via a charge cable 12. The charge cable 12 is usually housed in the vehicle 4 and is stretched out to be connected as illustrated in FIG. 1 for charging.

As described above, the vehicle 4 is a plug-in hybrid type, and a traveling mechanism 14 thereof can be driven both by an engine 18 which consumes gasoline in a fuel tank 16 for rotation and a motor 22 which consumes electric power from a secondary battery 20 for rotation. The secondary battery 20 is charged by a surplus power of the engine 18 and can also be charged by electric power supplied from the outside of the vehicle 4 via the charge connector 10. The secondary battery 20 is also charged by a counter electromotive force of the motor 22 when the vehicle reduces its speed.

The charge cable 12 is, as described later in detail, an electric power line incorporated in a power line communication (PLC) system. In other words, the charge cable 12 is an electric power line as well as a communication line for a digital communication signal that is combined with the electric power line. A PLC separating/combining unit 24 supplies electric power that the charge connector 10 receives via the charge cable 12 to the secondary battery 20 and separates the digital communication signal to be sent to a vehicle controller 26. On the other hand, the PLC separating/combining unit 24 combines an instruction from the vehicle controller 26 or data or the like stored in a storage unit 28 with the electric power line, which is output from the charge connector 10 to the outside of the vehicle 4. The storage unit 28 stores data or the like for authenticating the vehicle 4 externally.

The vehicle controller 26 further controls a display unit 30 and generates an infrared operating signal 36 from a wireless communication unit 34 in accordance with a manual operation with an operation unit 32. This infrared operating signal is, for example, a signal for opening or closing a garage door. In addition, the vehicle controller 26 monitors a charging state of the secondary battery 20.

The outlet unit 6 is supplied with electricity from an electric power line 38 incorporated in a PLC system, which is connected to the connector 8 via a power supply switching unit 40. The power supply switching unit 40 has a function of disconnecting the power supply to the connector 8 when it is not necessary and when an inconvenience occurs, and includes a meter or the like as well as a PLC separating/combining unit 42 which separates a signal for disconnecting the power supply and combines meter information with the electric power line 38. Details thereof will be described later.

The outlet unit 6 further includes a handy display unit 44 and a handy illumination unit 46. The handy display unit 44 displays the charging state or the like in the outlet unit 6 on the basis of the digital communication signal separated by a PLC separating unit 48. The handy illumination unit 46 illuminates the connector 8 and the handy display unit 44 on the basis of the digital communication signal separated by a PLC separating unit 50 when the outlet unit 6 is in dark.

The garage 2 further includes a garage illumination unit 52 and a garage door mechanism 54 that are connected to the electric power line 38 and are controlled by a garage controller 56 that are also connected to the electric power line 38. The garage controller 56 includes a PLC separating/combining unit 58 so as to combine control signals to the garage illumination unit 52, the garage door mechanism 54 and the like with the electric power line 38 to be output. Each of the control signals is separated by a PLC separating unit 60 or a PLC separating unit 62 so as to control the garage illumination unit 52 or the garage door mechanism 54.

For instance, the infrared operating signal 36 generated on the basis of a garage door opening operation of the operation unit 32 is received by the wireless communication unit 64, the PLC separating/combining unit 58 controlled by the vehicle controller 56 combines a garage door open control signal with the electric power line 38, and the signal is separated by the PLC separating unit 62 so that the garage door mechanism 54 is driven so as to open the garage door. Note that the infrared operating signal 36 may be automatically generated when the vehicle 4 approaches the garage 2.

In the same manner, the infrared operating signal 36 generated by a garage illumination ON operation of the operation unit 32 or automatic approach detection is received by a communication unit 64, the PLC separating/combining unit 58 controlled by the vehicle controller 56 combines a garage illumination ON control signal with the electric power line 38, and the signal is separated by the PLC separating unit 60 so that the garage illumination unit 52 for illuminating the entire garage is turned on.

Further, although the wireless communication unit 34 and the communication unit 64 are constituted to have the infrared communication function in Example 1 described above, each of them may be constituted as a wireless LAN communication unit. In this case, the wireless communication can be performed in a bidirectional manner at high speed by radio wave instead of the infrared operating signal 36, so that various types of information can be exchanged between the vehicle controller 26 and a controlling computer in a residential system 66 that will be described later.

In addition, if the communication unit 34 is constituted as a wireless LAN communication unit, and if the controlling computer in the residential system 66 can support the wireless LAN communication, various information can be exchanged between the communication unit 34 and the residential system 66 directly via wireless communication. In this case, the authentication data of the vehicle 4 stored in the storage unit 28 can be sent to the residential system 66 via the charge cable 12 or directly via the wireless LAN.

Further, if the garage 2 and the vehicle 4 are connected to each other via the charge cable 12, an operating signal of the operation unit 32 or the like can be combined with the electric power line by the PLC separating/combining unit 24, so that the garage illumination unit 52 or the garage door mechanism 54 can be controlled from the charge cable 12 via the electric power line 38.

In addition, instead of the direct control from the vehicle controller 26 as described above, it is possible to separate various digital signals on the electric power line 38 first by the PLC separating/combining unit 58 and to process the signals by the vehicle controller 56. After that, a specific control signal based on the result is combined with the electric power line 38 by the PLC separating/combining unit 58 so that the garage illumination unit 52, the garage door mechanism 54, and the like are controlled. In this case, the digital signals separated by the PLC separating/combining unit 58 may include not only the signal from the vehicle 4 but also information from the residential system 66 to which the garage 2 belongs.

Note that the electric power is supplied via a service wire 68, a buying and selling power meter 70, a distribution switchboard 72, and a PLC separating/combining unit 74 to the electric power line 38 in a house. The PLC separating/combining unit 74 is connected to an optical cable 76, and a digital communication signal sent received from the optical cable 76 is combined with the electric power line 38. In addition, a digital communication signal flowing in the electric power line 38 in the house is separated and is transmitted to the outside via the optical cable 76.

A solar cell system 78 includes a solar battery 80, and generated electric power is supplied via an inverter 82 to the distribution switchboard 72. If the electric power supplied from the solar cell system 78 is less than electric power consumed in the house, the buying and selling power meter 70 is in a power selling state. On the contrary, if the power supplied from the solar cell system 78 is more than the electric power consumed in the house, the buying and selling power meter 70 is in a power buying state.

The residential system 66 includes a controlling computer that will be described later, which controls the inside of the house and includes a PLC separating/combining unit 84 that is necessary for this control. Electric power selling and buying information from the buying and selling power meter 70 is sent via a LAN cable 86 to the residential system 66 and is processed by the controlling computer.

Figure 2:
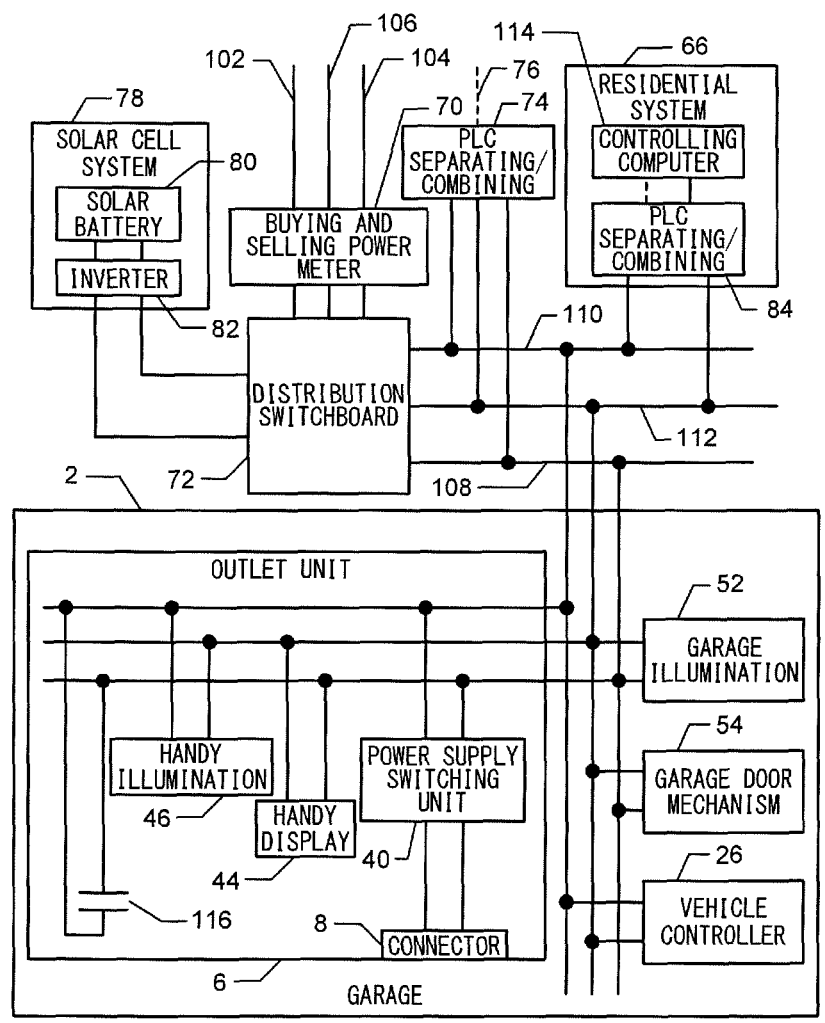
FIG. 2 is a block diagram illustrating particularly details of wiring relationship in Example 1 of FIG. 1.

FIG. 2 is a block diagram illustrating particularly details of wiring relationship in Example 1 of the vehicle charge system illustrated in FIG. 1. The configuration thereof is the same as that illustrated in FIG. 1, so the corresponding part is denoted by the same numeral, and description thereof is omitted as long as there is no necessity. Note that a part of the configuration illustrated in FIG. 1 is omitted in FIG. 2. For instance, details of the configuration of the power supply switching unit 40 and the like is not illustrated in FIG. 2, and the vehicle 4 is not illustrated at all. However, these parts are merely omitted for simple illustration, and they both have the same configuration. Therefore, Example 1 should be understood integrally with reference to FIGS. 1 and 2.

As understood from FIG. 2, the electric power line in Example 1 is a single-phase three-wire electric power line. Specifically, the service wire 68 illustrated in FIG. 1 is constituted of a first outside line 102, a second outside line 104 and a neutral line 106 as illustrated in FIG. 2. The neutral line 106 is connected to the ground at a utility pole or the like before being led into the house.

In contrast, the electric power line 38 provided in the house from the distribution switchboard 72 illustrated in FIG. 1 is also constituted of a first outside line 108, a second outside line 110 and a neutral line 112 as illustrated in FIG. 2. The first outside line 102 and the second outside line 104 have opposite phases with respect to the neutral line 106 and are supplied with AC voltage of 100 volts, respectively. As a result, AC voltage of 100 volts can be obtained from an outlet connected between the first outside line 108 and the neutral line 112, or between the second outside line 110 and the neutral line 112. In addition, alternating current of 200 volts can be obtained from an outlet connected between the first outside line 108 and the second outside line 110.

The PLC separating/combining unit 74 combines a communication signal received from the optical cable 76 with between the first outside line 108 and the neutral line 112 as well as between the second outside line 110 and the neutral line 112. In addition, the PLC separating/combining unit 74 separates each of the communication signal from between the first outside line 108 and the neutral line 112 and the communication signal between the second outside line 110 and the neutral line 112 so as to transmit the separated signal via the optical cable 76. Further, between the first outside line 108 and the second outside line 110, there is provided a relay coupler which cuts off the AC frequency band of approximately 50 Hz or 60 Hz of the electric power and passes high frequency communication signals, so as to relay communication signals between the first outside line 108 and the neutral line 112 as well as communication signals between the second outside line 110 and the neutral line 112 in the house. Details of such relaying of PLC communication signals between the first outside line 108 and the second outside line 110 is described in Japanese Patent Application 2007-298696 filed by the same applicant.

As a result, PLC supporting equipment that utilizes an outlet connected between the first outside line 108 and the neutral line 112, PLC supporting equipment that utilizes an outlet connected between the second outside line 110 and the neutral line 112, and the PLC supporting equipment that utilizes an outlet connected between the first outside line 108 and the second outside line 110 can perform PLC communication with each other and can perform communication with outside via the optical cable 76.

The PLC separating/combining unit 84 of the residential system 66 is connected to an outlet connected between the second outside line 110 and the neutral line 112 so as to supply alternating current of 100 volts to a power source of a controlling computer 114. In addition, the PLC separating/combining unit 84 combines a communication signal output from the controlling computer 114 with between the second outside line 110 and the neutral line 112, and separates a communication signal from between the second outside line 110 and the neutral line 112 so as to supply the separated signal to the controlling computer 114.

Note that the PLC separating/combining unit 84 may be connected to an outlet connected between the first outside line 108 and the neutral line 112 instead of the outlet connected between the second outside line 110 and the neutral line 112 as illustrated in FIG. 2, so as to function in the same manner.

In the garage 2, the three lines including the first outside line 108, the second outside line 110 and the neutral line 112 are wired, and these lines are also wired in the outlet unit 6 as they are. Inside the outlet unit 6, the power supply switching unit 40 is connected to the first outside line 108 and the second outside line 110 so as to supply alternating current of 200 volts to the connector 8. Thus, a boost charge to the vehicle 4 can be performed.

In addition, the handy display unit 44 is connected to an outlet connected between the first outside line 108 and the neutral line 112. In addition, the handy illumination unit 46 is connected to an outlet connected between the second outside line 110 and the neutral line 112.

Further, the garage illumination unit 52 and the garage door mechanism 54 in the garage 2 are connected to outlets connected between the first outside line 108 and the neutral line 112. The garage controller 26 is connected to an outlet connected between the second outside line 110 and the neutral line 112.

Further, between the first outside line 108 and the second outside line 110 of the outlet unit 6, there is provided a relay coupler 116 which cuts off the AC frequency band of the electric power and passes high frequency communication signals, so as to relay communication signals between the first outside line 108 and the neutral line 112 as well as communication signals between the second outside line 110 and the neutral line 112 in the garage 2.

Such relaying is performed also in the PLC separating/combining unit 74 near the distribution switchboard 72 as described above. In order to compensate for attenuation of the communication signal at a part where the electric power line is distant from a relay unit, the communication signal between the first outside line 108 and the second outside line 110 is relayed also in the garage 2, so that the PLC communication using the first outside line 108 and the neutral line 112, as well as the PLC communication using the second outside line 110 and the neutral line 112 is relayed. Note that the PLC communication with the vehicle 4 via the connector 8 is performed using both the first outside line 108 and the second outside line 110, so that the separation and the combination of the communication signal is performed between the both lines and the ground.

Figure 3:
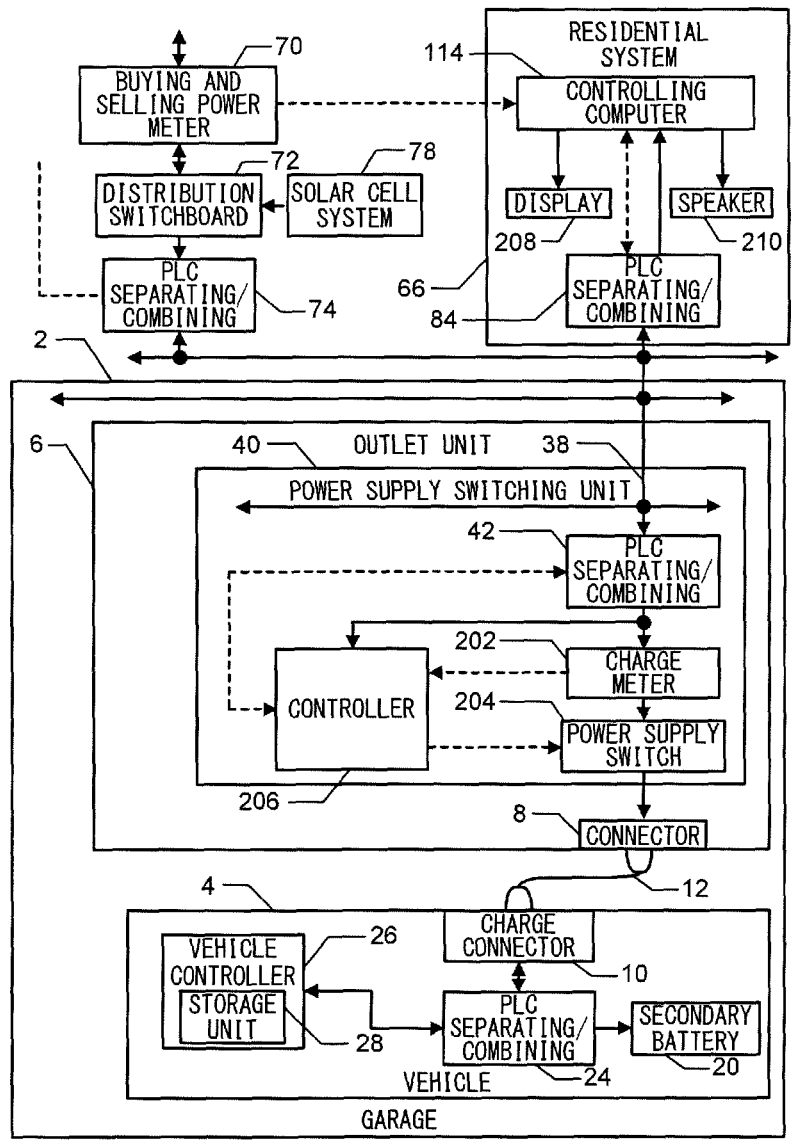
FIG. 3 is a block diagram illustrating details of a power supply switching unit and a residential system in an outlet unit in a garage in Example 1 of FIG. 1.

FIG. 3 is a block diagram illuminating Example 1 of the vehicle charge system illustrated in FIG. 1 in the same manner as in FIG. 2, and particularly illustrates details of the power supply switching unit 40 and the residential system 66 in the outlet unit 6 of the garage 2 for describing details of control by the controlling computer 114.

Similarly to FIG. 2, the configuration illustrated in FIG. 3 is the same as that illustrated in FIG. 1. Therefore, the corresponding part is denoted by the same numeral, and description thereof is omitted as long as there is no necessity. Note that a part of the configuration illustrated in FIG. 1 or 2 is omitted in FIG. 3 for simple illustration, but the examples are the same. Therefore, the configuration should be understood with reference to FIGS. 1 to 3 integrally.

In the power supply switching unit 40, a charge meter 202 and a power supply switch 204 are disposed between the PLC separating/combining unit 42 and the connector 8. This charge meter 202 monitors electric power that is consumed for charging the vehicle 4, by detecting current flowing from the electric power line 38 to the connector 8. The monitoring result of the electric power is sent to a controller 206 and is combined with the electric power line 38 by the PLC separating/combining unit 42 so as to be transmitted to the controlling computer 114.

In addition, the charge meter 202 performs not only the usual charge monitoring but also output impedance detection of the connector 8 by sensing current. Then, if the charge meter 202 detects an abnormal state of the output impedance when an unexpected device other than the vehicle 4 is connected to the connector 8, the detection result is informed to the controlling computer 114 via the controller 206 and the PLC separating/combining unit 42.

When the power supply switch 204 receives an instruction that the connector 8 should not be supplied with electric power from the controller 206, the power supply switch 204 cuts off the power supply. The instruction from the controller 206 is determined by the controlling computer 114, for example, when the above-mentioned abnormal state of the output impedance occurs or when the vehicle 4 cannot be authenticated as described later, so that the power supply is cut off. Thus, a risk of unexpected output of 200 volts power from the connector or theft of electricity can be prevented.

The controlling computer 114 is connected to a display unit 208 and a speaker 210 for informing residents in the house of various types of information concerning the residential system 66 by display or announcement. In addition, the display unit 208 and the speaker 210 are controlled by the controlling computer 114 to inform residents in the house of remote information from the controller 206 about the charging state, an abnormal state of impedance, failure of authentication of the vehicle, or other remote information in the garage 2.

Figure 4:
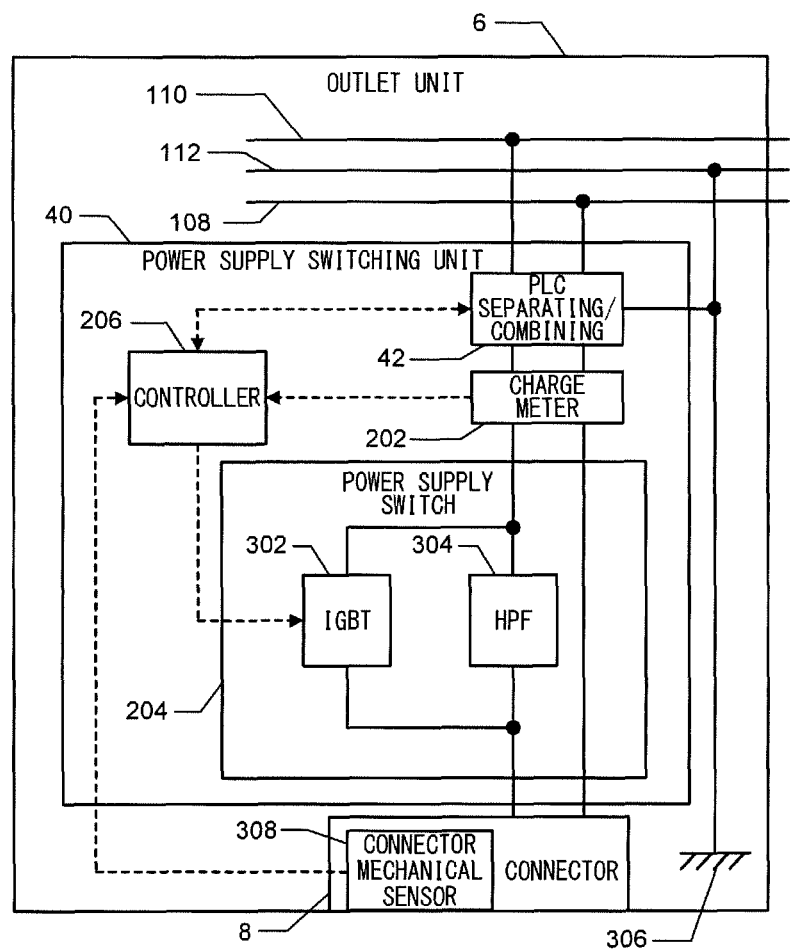
FIG. 4 is a block diagram illustrating details of a power supply switch and the like in the power supply switching unit in Example 1 of FIG. 1.

FIG. 4 is a block diagram illuminating Example 1 of the vehicle charge system illustrated in FIG. 1 in the same manner as in FIGS. 2 and 3, and particularly illustrates details of the power supply switch 204 and the like in the power supply switching unit 40 for describing details of the power supply control.

Similarly to FIGS. 2 and 3, the configuration illustrated in FIG. 4 is the same as that illustrated in FIG. 1. Therefore, the corresponding part is denoted by the same numeral, and description thereof is omitted as long as there is no necessity. Note that configurations other than the outlet unit 6 in FIG. 4 are omitted for simple illustration, but the examples are the same. Therefore, the configuration should be understood with reference to FIGS. 1 to 4 integrally.

It is apparent from FIG. 4 that the power supply switch 204 in Example 1 of the present invention has an insulated gate bipolar transistor (IGBT) 302, which performs switching on the basis of a control signal from the controller 206 so as to connect or disconnect between the charge meter 202 and the connector 8. A high-pass filter 304 is connected in parallel with the IGBT 302, which passes high frequency digital signals in the PLC communication regardless of ON or OFF of the IGBT 302. The high-pass filter 304 cuts off the AC frequency band of approximately 50 Hz or 60 Hz of the electric power, and therefore the IGBT 302 determines whether or not to supply the electric power.

The neutral line 112 is connected to a ground 306 in the outlet unit 6 as illustrated in FIG. 4. The neutral line is connected to the ground on the utility pole or the like before the neutral line 106 (see FIG. 2) is led in the house, but for safety, it is connected to the ground in the outlet unit 6, too. In addition, the PLC separating/combining unit 42 is connected to the ground 306, so that both the first outside line 108 and the second outside line 110 are used for performing separation and combination of the communication signal between the both lines and the ground.

It is apparent from FIG. 4 that the connector 8 is further equipped with a connector mechanical sensor 308 which detects mechanically a shape of a connection plug of the charge cable 12 to be connected to the connector 8 and sends the detection result to the controller 206. Therefore, even if electric connection to the connector 8 is performed, if the connector mechanical sensor 308 cannot detect that the shape of the connection plug is a predetermined shape, the result is informed to the controlling computer 114 from the controller 206 via the PLC separating/combining unit 42. When the controlling computer 114 receives the result, the controlling computer 114 sends a signal for turning off the IGBT 302 to the controller 206, so that the voltage of 200 volts at the connector 8 is not output to non-rated equipment for preventing risk and theft of electricity.

Figure 5:
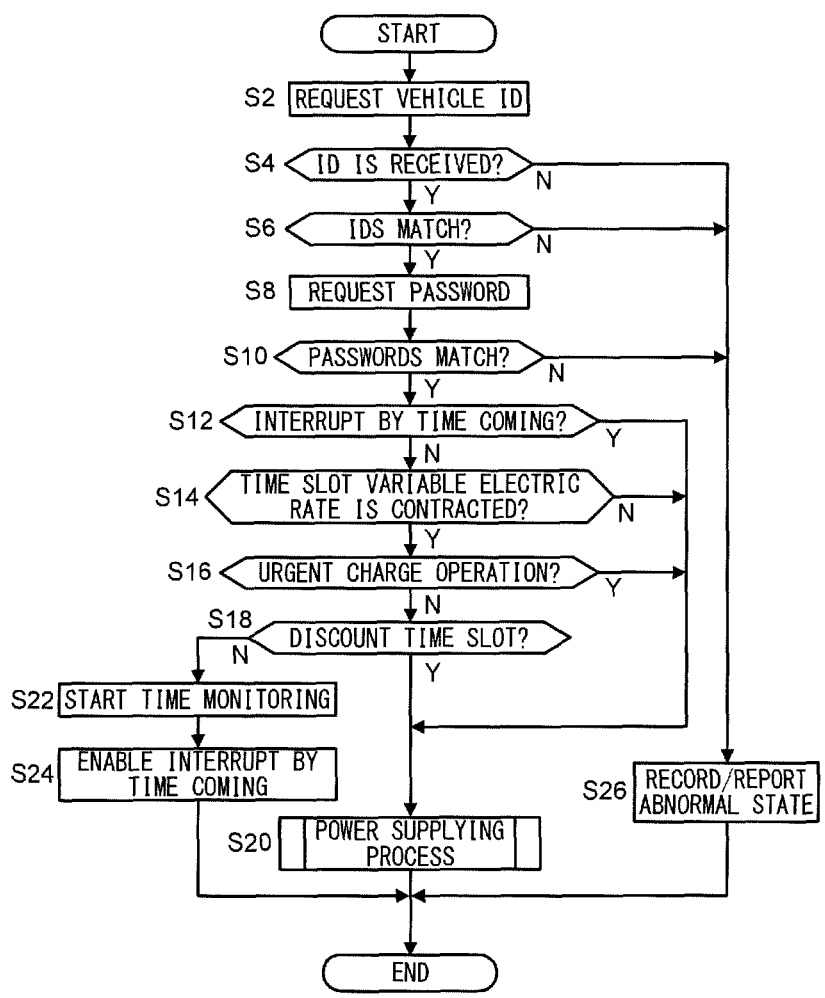
FIG. 5 is a flowchart illustrating an elementary action of a controlling computer of the residential system.

FIG. 5 is a flowchart illustrating an elementary action of the controlling computer 114. This process flow starts when the charge cable 12 is connected to the connector 8, or a charge start time comes when a late-night rate starts in the state where the charge cable 12 is connected.

When the process flow starts, a request to send ID for vehicle authentication is issued to the vehicle 4 in Step S2. Then, it is checked in Step S4 whether or not the ID is received. If the reception is detected, the process flow goes to Step S6 in which it is checked whether or not the ID matches with the enrolled one. If the matching of the ID is detected in Step S6, the process flow goes to Step S8 in which a password is requested. Then, if matching of the password is detected in Step S10, the process flow goes to Step S12.

The request and transmission of the ID and the password in the above-mentioned step is performed by wired communication via the PLC system, but it may be performed by wireless communication via the communication units 34 and 64.

In Step S12, it is checked whether or not the process flow has started by interrupt when the charge start time came in the state where the charge cable 12 is connected.

If it is not detected in Step S12 that the process flow has started by interrupt when the charge start time came, it means that the process flow has started by connection of the charge cable 12. Therefore, the process flow goes to Step S14 in which it is checked whether or not the time slot variable electric rate including late-night discount rate is contracted.

If it is detected in Step S14 whether or not the time slot variable electric rate is contracted, the process flow goes to Step S16 in which it is checked whether or not an urgent charge operation is performed so as to start charging quickly regardless of whether or not it is the late-night time slot.

Then, if the urgent charge operation is not detected in Step S16, the process flow goes to Step S18 in which it is checked whether or not it is a discount time slot such as the late-night rate. If it is true, the process flow goes to Step S20 in which the power supplying process is performed. Then, when the power supplying process is completed, the process flow is finished. Details of the power supplying process will be described later.

On the other hand, if it is detected in Step S12 that the process flow has started by interrupt when the charge start time came, or if it is not detected in Step S14 that the time slot variable electric rate is contracted, or if the urgent charge operation is detected in Step S16, the process flow goes promptly to Step S20 for the power supplying process.

In addition, if it is detected in Step S18 that it is the discount time slot, the process flow goes to Step S22 in which time monitoring is started for detecting the discount time slot to come. Further, in Step S24, interrupt is enabled for starting the process flow illustrated in FIG. 5 when the coming of the time is detected, and the process flow is finished. Thus, the controlling computer 114 becomes a standby state waiting for the time comes.

Further, if the reception of the ID cannot be confirmed in Step S4, or if the matching of the ID cannot be detected in Step S6, or if the matching of the password cannot be detected in Step S10, the process flow goes to Step S26 in which the abnormal state is recorded and reported, and the process flow is finished promptly. This report is performed by the display unit 208 or the speaker 210 illustrated in FIG. 3.

Figure 6:
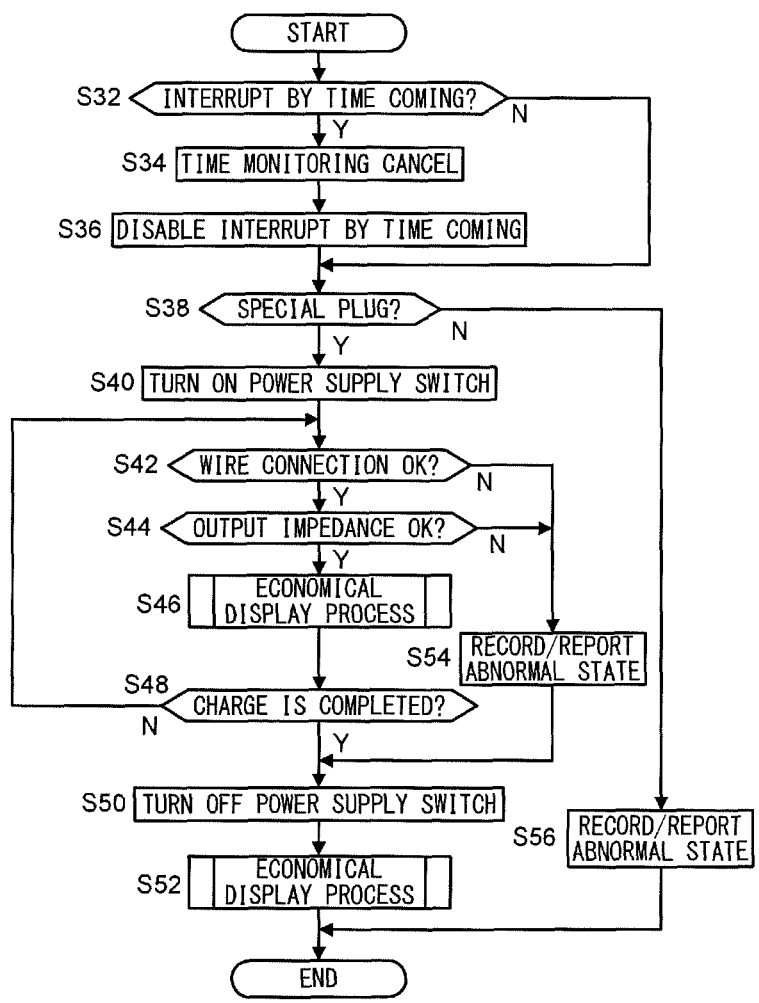
FIG. 6 is a flowchart illustrating details of Step S20 in FIG. 5.

FIG. 6 is a flowchart illustrating details of the power supplying process in Step S20 of FIG. 5. When the process flow starts, it is checked again whether or not the process flow has started by the interrupt when the charge start time comes in the state where the charge cable 12 is connected in Step S32.

If the process flow has started by the interrupt by the time coming, the time monitoring is cancelled in Step S34 and the interrupt by the time coming is disabled in Step S36. Then, the process flow goes to Step S38. On the contrary, if it is not the interrupt by the time coming, the process flow goes directly to Step S38.

In Step S38, it is checked whether or not the connector mechanical sensor 308 illustrated in FIG. 4 has detected connection of a special plug of the charge cable 12. If the connection of a special plug is detected, the process flow goes to Step S40 in which the power supply switch 204 is turned on. Thus, the 200 volts voltage of the power supply is applied to the connector 8.

Next, in Step S42, on the basis of a signal from the charge meter 202, it is checked whether or not wire connection after the charge cable 12 is OK for flowing current. If the wire connection is OK, the process flow goes to Step S44 in which it is checked whether or not the output impedance is OK as expected also on the basis of the signal from the charge meter 202.

If it is detected in Step S44 that the output impedance is OK, the process flow goes to Step S46 in which an economical display process is started. Details thereof will be described later.

When the economical display process is finished, the process flow goes to Step S48 in which it is checked whether or not charging is completed on the basis of information from the charge meter 202 or the secondary battery 20 of the vehicle 4. If the charge completion is not detected, the process flow goes back to Step S42, and the process from Step S42 to Step S48 is repeated until the charging is completed unless an abnormal state of the wire connection or the impedance is detected.

If the charge completion is detected in Step S48, the process flow goes to Step S50 in which the power supply switch 204 is turned off, and the process flow goes to Step S52 for the economical display process. Then, if the economical display process is completed, the process flow is finished.

On the contrary, if it is not detected in Step S42 that the wire connection is OK, or if it is not detected in Step S44 that the output impedance is OK, the process for recording and reporting the abnormal state is performed in Step S54, and the process flow goes promptly to Step S50 in which the power supply switch 204 is turned off. Further, the period after turning on the power supply switch 204 in Step S40 until turning off the power supply switch 204 in Step S50 due to such an abnormal state is very short. Therefore, electric power cannot substantially be taken out from the connector 8, so there is not risk.

In addition, if the special plug cannot be detected in Step S38, the process flow goes to Step S56 in which the process for recording and reporting the abnormal state is performed, and the process flow is finished promptly.

Figure 7:
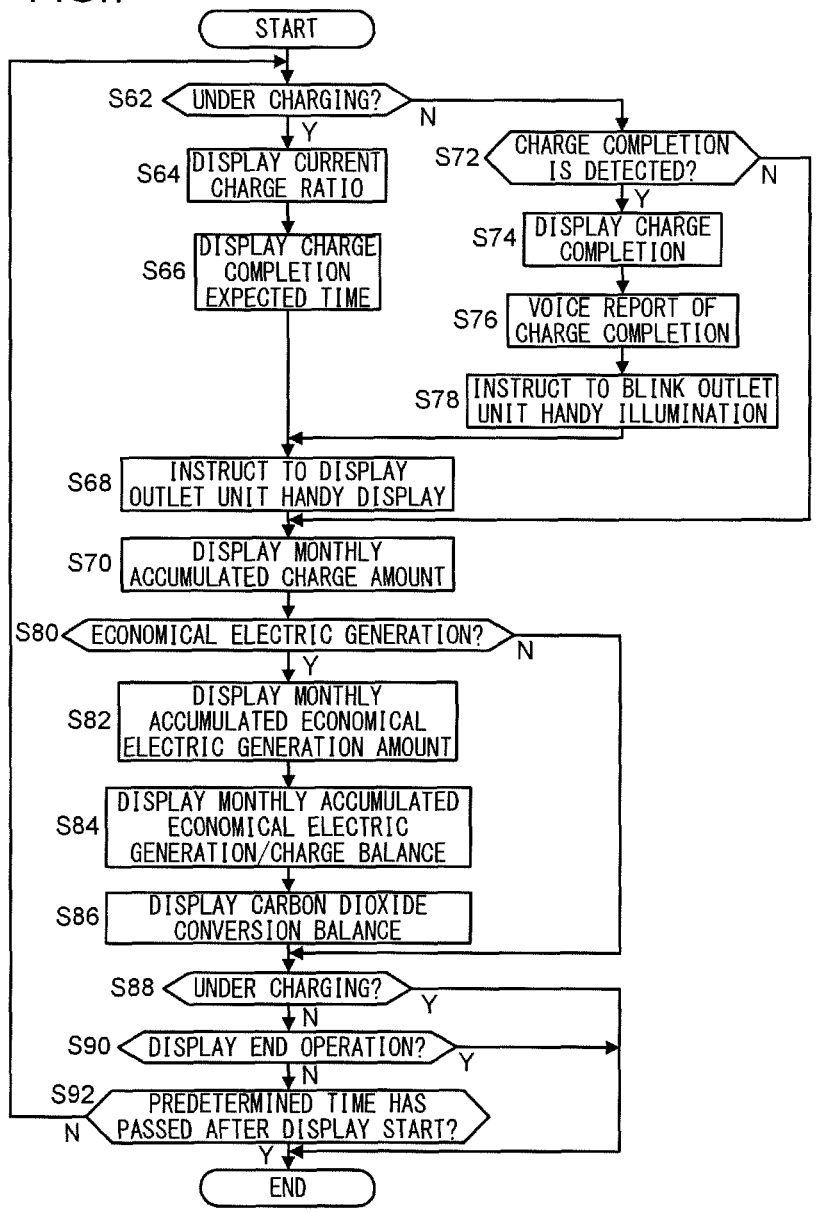
FIG. 7 is a flowchart illustrating details of Steps S46 and S52 in FIG. 6.

FIG. 7 is a flowchart illustrating details of the economical display process in Steps S46 and S52 in FIG. 6. When the process flow starts, it is checked in Step S62 whether or not it is under charging. If it is under charging, the process flow goes to Step S64 in which the process for displaying a current charge ratio is performed. Then, the process for displaying expected time for charge completion is performed in Step S66, and the process flow goes to Step S68.

Further, the process flow goes to Step S70 in which an instruction for performing the handy display on the outlet unit 6 is issued, and the process flow goes to Step S70. These steps correspond to the operation at the time point of Step S46 in FIG. 5.

On the contrary, if it is not detected in Step S62 that it is under charging, the process flow goes to Step S72 in which it is checked whether or not the charging is completed. Then, if the charging is completed, the process flow goes to Step S74 in which the process for displaying the charge completion. Further, in Step S76, the process for performing voice report to announce the charge completion is performed. Further, in Step S78, the process for blinking the handy illumination unit 46 of the outlet unit 6 is performed, and the process flow goes to Step S68. This is to make the display of charge completion be conspicuous on the handy display 44 and to enable to notify the charge completion only by the handy illumination unit 46.

In addition, if the charge completion is not detected in Step S72, it means that the charging process is not being performed or not completed, so the process flow goes directly to Step S70.

The above-mentioned operation from Step S72 via Step S78 to Step S68, or the operation from Step S72 to Step S72 directly corresponds to the operation at the time point of Step S52 in FIG. 5.

In Step S70, a monthly accumulated charge amount in the vehicle 4 is displayed. Then, the process flow goes to Step S80 in which it is checked whether or not an economical electric generation system that can sell electricity like a solar cell system 78 or a wind electric generation system is installed in the house.

If the economical electric generation system is installed, the process flow goes to Step S82 in which a monthly accumulated economical electric generation amount is displayed. Further, in Step S84, a balance between the monthly accumulated economical electric generation amount and the monthly accumulated charge amount in the vehicle 4 is displayed. Thus, a ratio of charge amount from the natural energy in the total charge amount in the vehicle 4 can be derived. Further, the balance in the Step S84 is converted into a carbon dioxide emission amount and is displayed in Step S86, and then the process flow goes to Step S88. These are contents of the economical display which displays contribution to earth environment protection by using the vehicle 4 and its charge system.

Note that if adoption of the economical electric generation system cannot be detected in Step S80, the economical display described above is omitted, and the process flow goes directly to Step S88.

In step 88, it is checked again whether or not it is under charging. If it is not detected that it is under charging, the process flow goes to Step S90 in which it is checked whether or not a display end operation is performed. If the operation is not performed, the process flow goes to Step S92 in which it is checked whether or not a predetermined time has passed from start of the display. Then, if the predetermined time has not passed, the process flow goes back to Step S62. After that, the process from Step S62 to Step S92 is repeated if it is not under charging and a predetermined time has not passed. This is to sustain the display after the charge completion for a predetermined time.

Note that if the predetermined time has passed in Step S92, the process flow of the economical display process is finished. In addition, if it is detected in Step S90 that the display end operation is performed, too, the economical display process flow is finished. The above-mentioned process corresponds to the operation in the case of Step S52 in FIG. 6.

On the contrary, if it is detected in Step S88 that it is under charging, too, the economical display process in FIG. 7 is finished. This corresponds to the operation of Step S46 in FIG. 6, and the process flow goes to Step S46 for the economical display process again via Step S42.

Note that the flowchart for the economical display illustrated in FIG. 7, as described above, functions as a part of the power supplying process as details of the process flow in Steps S46 and S52 of FIG. 6 and also operates by interrupt when a display start operation signal is sent to the controlling computer 114 regardless of the power supply. In this case, the process flow goes from Step S62 via Step S72 directly to Step S70.

As described above, in Example 1 of the present invention, the vehicle charge system including the garage 2 that can house the plug-in hybrid type vehicle 4 is disclosed. However, the present invention is not limited to this but can also be applied to an electric vehicle that does not use a gasoline engine and a vehicle charge system including a garage that can house the vehicle.

In addition, the various features of the present invention can be applied not only to the garage belonging to the house as described above in Example 1 but also to a parking lot for a business.

Figure 8:
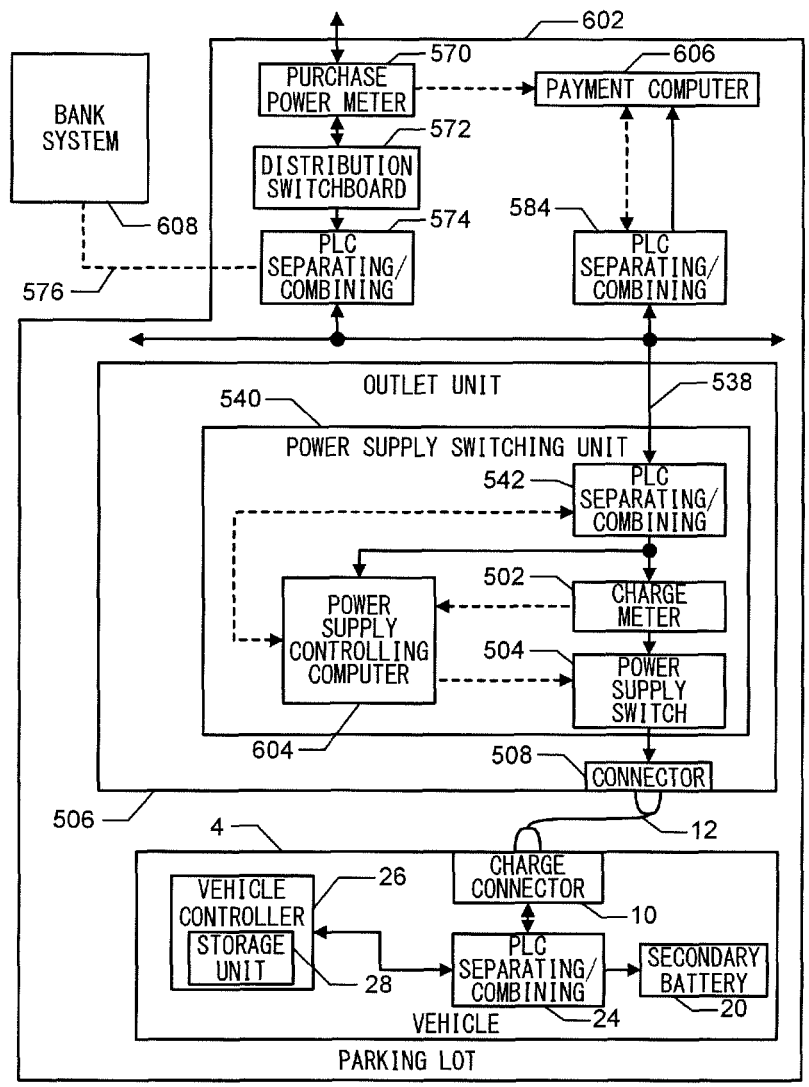
FIG. 8 is a block diagram illustrating Example 2 of the vehicle charge system according to the embodiment of the present invention.

FIG. 8 is a block diagram illustrating Example 2 of a vehicle charge system according to an embodiment of the present invention. Although Example 1 is constituted to be suitable for an application of a garage of an ordinary house, Example 2 is constituted to be suitable for an application of a business parking lot paid for by the month or a parking lot in a city or a shop for visitors. Note that there are many elements in FIG. 8 that are the same as those illustrated in FIG. 3. Therefore, the same element is denoted by the same numeral. In addition, a similar (corresponding) element in FIG. 8 is denoted by numeral that is 500 plus the same two lower digits as in FIG. 3. Descriptions of these elements are omitted unless necessary.

A parking lot 602 is a business parking lot paid for by the month or a parking lot in a city or a shop for visitors as described above, where the vehicle 4 can be parked. An outlet unit 506 performs charging of the vehicle 4 similarly to the outlet unit 6 illustrated in FIG. 3 and is controlled by a power supply controlling computer 604. The power supply controlling computer 604 has a function similar to that of the controller 206 illustrated in FIG. 3, and details thereof will be described later.

The parking lot 602 is controlled by a payment computer 606. This payment computer 606 corresponds to the controlling computer 114 illustrated in FIG. 3. In Example 2 illustrated in FIG. 8, the payment computer 606 is mainly in charge of payment for the charged electric power in conjunction with a bank system 608 connected via the Internet. Specifically, electric power purchased via a purchase power meter 570 is supplied from the outlet unit 506 to the vehicle 4, and fee of electric power purchased finally by the vehicle 4 is paid from a bank account of the owner of the vehicle 4 in the bank system 608. The power supply controlling computer 604 controls the power supply from the outlet unit 506 to the vehicle 4 in conjunction with the payment computer 606 as described later.

Further, also in Example 2 illustrated in FIG. 8, the communication signal via an optical cable 576 is separated from and combined with an electric power line 538 in the parking lot 602 by a PLC separating/combining unit 576, so that communication in the parking lot 602 is performed by PLC. In addition, although only one outlet unit is illustrated in FIG. 8, the parking lot 602 has a structure for parking a plurality of vehicles, and a plurality of similar outlet units are disposed as described later.

Figure 9:
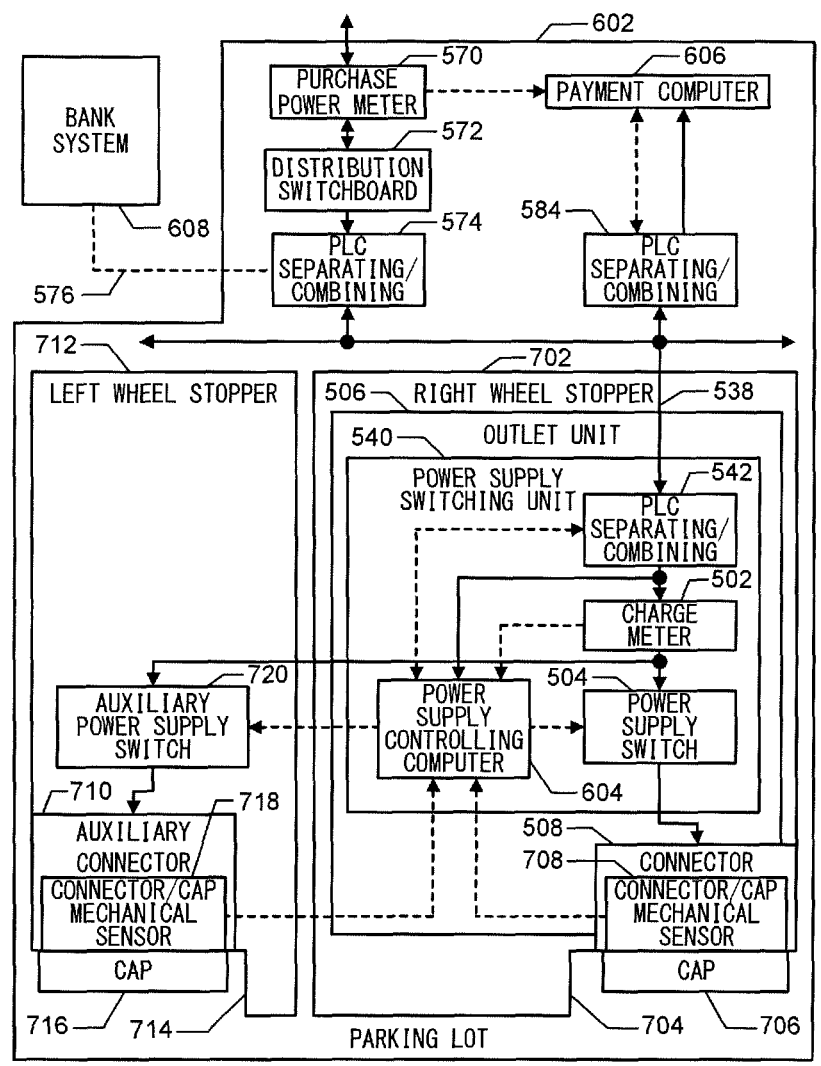
FIG. 9 is a block diagram illustrating details of a configuration of the outlet unit in Example 2.

FIG. 9 is a block diagram illustrating details of a configuration of the outlet unit 506 of Example 2 illustrated in FIG. 8. The same element as that illustrated in FIG. 8 is denoted by the same numeral, and description thereof is omitted unless necessary. Note that a part of the configuration illustrated in FIG. 8 is omitted in FIG. 9. However, this omission is merely for simple illumination. Since they have the same configuration, Example 2 should be understood with reference to FIGS. 8 and 9 integrally.

It is apparent from FIG. 9 that the outlet unit 506 is provided to a right wheel stopper 702 disposed in the parking space in Example 2. Further, a connector 508 is disposed so as to face downward in a recess 704 on the right face of the right wheel stopper 702 for avoiding wind and rain, which is close to the right rear wheel of the vehicle 4 when it is parked backward.

The connector 508 can be covered with a cap 706 for protecting the connector 508 from dust when it is not used. A connector/cap mechanical sensor 708 detects whether or not a shape of the connection plug connected to the connector 508 is a predetermined shape in the same manner as the connector mechanical sensor 308 illustrated in FIG. 4 and also detects a attached or detached state of the cap 706, and the detection result is sent to the power supply controlling computer 604.

The connector 508 that is provided to the right wheel stopper 702 as described above is suitable for the case where the charge connector 10 is provided to the right side of the vehicle 4. For the case where the charge connector 10 is provided to the left side of the vehicle 4 that is parked, an auxiliary connector 710 having the same configuration is disposed in a recess 714 provided to the left face of a left wheel stopper 712. The auxiliary connector 710 can also be covered with a cap 716 and is provided with a connector/cap mechanical sensor 718 similarly to the right connector.

An auxiliary power supply switch 720 that is similar to the right power supply switch 504 is provided for power supply control in the case where the connection plug of the vehicle 4 is connected to the auxiliary connector 710. On the basis of the detection result by the connector/cap mechanical sensor 718, the power supply controlling computer 604 controls ON and OFF of the auxiliary power supply switch 720. The auxiliary connector 710 and the auxiliary power supply switch 720 are disposed in an outlet unit (not shown) of the left wheel stopper 712 so as to be easily disposed in the left wheel stopper 712. However, unlike the outlet unit 506, the power supply controlling computer 604, the charge meter 502, and a PLC separating/combining unit 542 are not provided. The outlet unit of the left wheel stopper 712 has a simple configuration including only an electric power line input unit to the auxiliary power supply switch 720 and a communication line connector with the power supply controlling computer 604.

In this way, the power supply from the right connector 508 and the power supply from the left auxiliary connector 710 are controlled individually, and a power supply switch is provided to each of the connectors, so that an unexpected situation where the voltage is applied to the connector to which no connection plug is connected can be prevented.

Further, after the power supply controlling computer 604 starts the power supply from one of the right connector 508 and the left auxiliary connector 710 that are respectively provided to the right wheel stopper 702 and the left wheel stopper 712 constituting a pair, the power supply controlling computer 604 controls the power supply switch 504 or the auxiliary power supply switch 720 so that power supply is not performed from the other connector as long as the power supply from the former connector continues even if it is detected that a connection plug of the vehicle 4 is connected to the other connector.

This is to prevent that current over rating flows in one outlet unit when charging is performed from two connectors simultaneously as a result of providing two connectors to the left and the right. It is apparent from FIG. 9 that the same charge meter 502 is used in either case where the right connector 508 or the left auxiliary connector 710 is used for the charging, so there is no influence to the payment.

Figure 10:
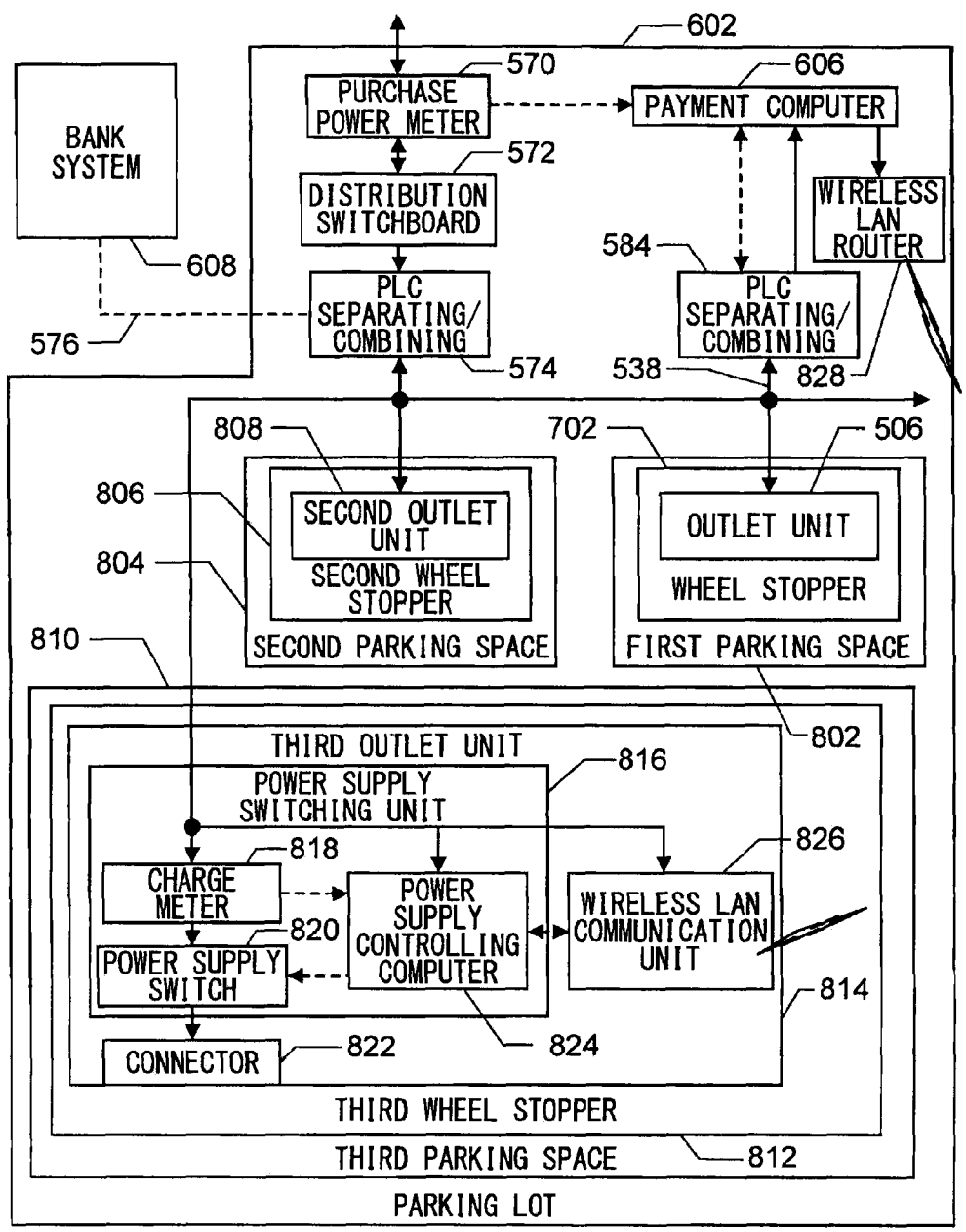
FIG. 10 is a block diagram illustrating a layout of a plurality of outlet units in Example 2.

FIG. 10 is a block diagram illustrating a layout of a plurality of outlet units provided to the parking lot 602 of Example 2 illustrated in FIGS. 8 and 9. The same element as that in FIG. 8 or 9 is denoted by the same numeral, and description thereof is omitted unless necessary. Note that a part of the configuration illustrated in FIG. 8 or 9 is omitted in FIG. 10 only for a simple illustration. Since they have the same configuration, Example 2 should be understood with reference to FIGS. 8 to 10 integrally.

As apparent from FIG. 10, the right wheel stopper 702 to which the outlet unit 506 is provided is disposed in the first parking space 802. In FIG. 10, for simple illustration as described above, the left wheel stopper 712 disposed in the first parking space 802 is omitted. The same is true for other parking spaces.

In the same manner, a second wheel stopper 806 is disposed in a second parking space 804, in which a second outlet unit 808 that is similar to the outlet unit 506 is disposed. A similar wheel stopper with an outlet unit is disposed in other parking space too, but it is omitted in the diagram for simple illustration. Communication of the outlet unit is performed by PLC, so it is sufficient only to wire the electric power line for charging to each wheel stopper when a parking space is added.

On the other hand, a third wheel stopper 812 of a third parking space 810 is provided with a third outlet unit 814 that does not support the PLC communication. A power supply switching unit 816 of the third outlet unit 814 includes a charge meter 818, a power supply switch 820 and a connector 822 similarly to the configuration illustrated in FIG. 8 or 9, but communication method of a power supply controlling computer 824 is different.

The third outlet unit 814 uses a wireless LAN communication unit 826 instead of the PLC, which communicates with a wireless LAN router 828 connected to the payment computer 606. In this way, if the parking lot 602 is in the environment of wireless LAN, it is sufficient to equip the third outlet unit 814 with the wireless LAN communication unit 826 for supporting increase of parking spaces only by wiring the electric power line. Further, if it is possible to wire a LAN cable too, communication between the power supply controlling computer 824 and the payment computer 606 may be performed by the wired LAN.

Figure 11:
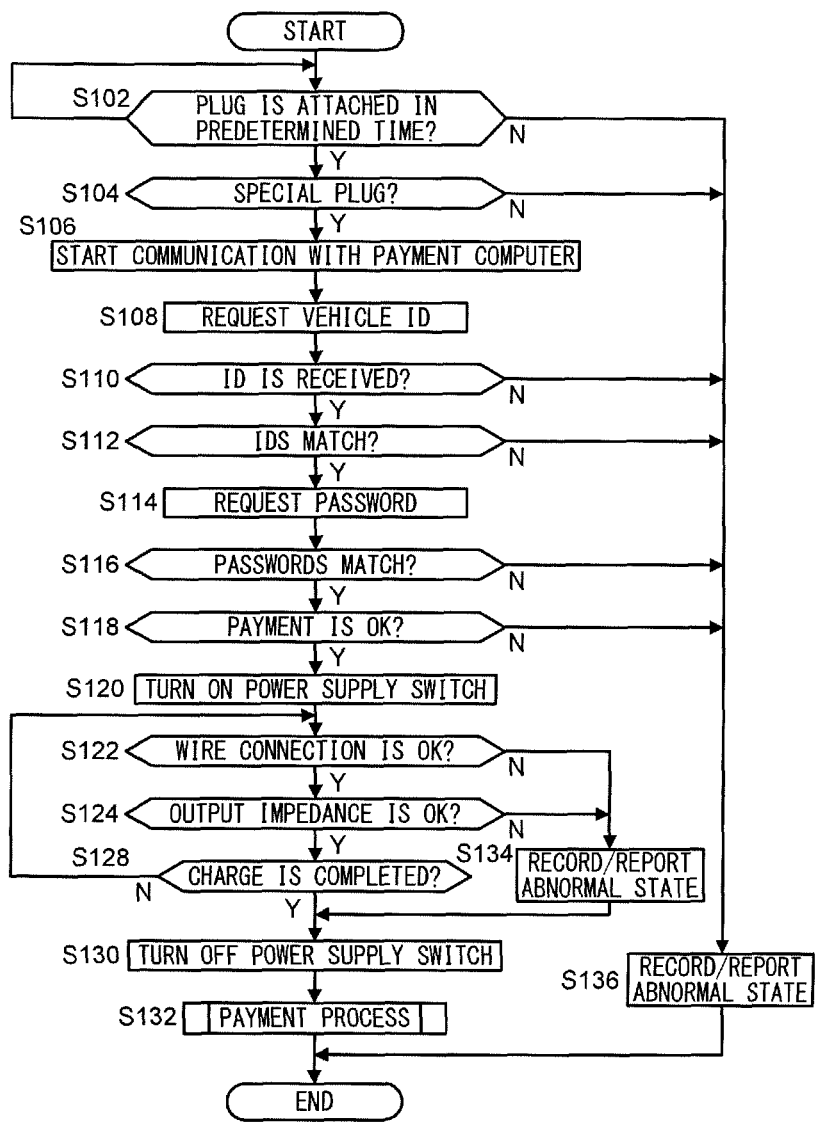
FIG. 11 is a flowchart illustrating an elementary action of a power supply controlling computer in Example 2.

FIG. 11 is a flowchart illustrating an elementary action of the power supply controlling computer 604 provided to the outlet unit 506 illustrated in FIGS. 8 to 10 in Example 2 or the power supply controlling computer 824 provided to the third outlet unit 814 illustrated in FIG. 10. This process flow starts when the connector/cap mechanical sensor 708 or 718 detects the cap 706 of the connector 508 or the cap 712 of the auxiliary connector 710 illustrated in FIG. 9 is removed.

When the process flow starts, it is checked whether or not a plug is attached in a predetermined time from the removal of the cap in Step S102, and the process of Step S102 is repeated until the predetermined time passes.

If it is detected in Step S102 that a plug is attached in the predetermined time, the process flow goes to Step S104 in which it is checked whether or not the connector/cap mechanical sensor 708 or 718 has detected connection of the special plug of the charge cable 12. If the special plug is connected, the process flow goes to Step S106 in which communication with the payment computer 606 is started.

Next, the process flow goes to Step S108 in which on the basis of an instruction from the payment computer 606, a request to send the ID for vehicle authentication is sent to the vehicle 4. Then, it is checked in Step S110 whether or not the ID has been received. If the reception is detected, the process flow goes to Step S112 in which it is checked whether or not the ID matches with the enrolled one.

The check in Step S112 is specifically performed as follows. First, the received ID is sent to the bank system 608 via the payment computer 606. When the bank system 608 confirms the matching between the received ID and the ID enrolled in the account, the result is informed to the power supply controlling computer 604 or 824 via the payment computer 606.

If it is confirmed in Step S112 that the ID matches with the enrolled one on the basis of the information, the process flow goes to Step S114 in which a password is requested. Then, if matching of the password is detected in Step S116, the process flow goes to Step S118. In Step S118, it is checked whether or not there is enough money for the payment in the account of customer authenticated by the ID and the password so that the payment can be made. If the payment can be made, the process flow goes to Step S120.

The checking processes in Steps S116 and S118 are both performed by communication with the bank system 608 via the payment computer 606 similarly to Step S112. Note that the payment computer 606 may decide a result of the checking so as to send only an instruction of the result to the power supply controlling computer 604 or 824 instead of only relaying the information.

In Step S120, the power supply switch 504, 720 or 820 is turned on, so that the power supply voltage of 200 volts is applied to the corresponding connector.

Next, in Step S122, it is checked whether or not the wire connection after the charge cable 12 is OK so that current can flow, on the basis of the signal from the charge meter 502 or 818. Then, if the wire connection is OK, the process flow goes to Step S124 in which it is checked whether or not the output impedance is OK as expected on the basis of the signal from the charge meter 502 or 818 again.

If it is detected in Step S44 that the output impedance is OK, the process flow goes to Step S128 in which it is checked whether or not the charging has completed on the basis of information from the charge meter 502 or 818 or the secondary battery 20 of the vehicle 4. Then, if the charge completion is not detected, the process flow goes back to Step S122. After that, the process from Step S122 to Step S128 is repeated until the charging is completed unless an abnormal state of the wire connection or the impedance is detected.

If the charge completion is detected in Step S128, the process flow goes to Step S130 in which the power supply switch 504, 720 or 820 is turned off, and the process flow goes to Step S132 for the payment process. When the payment process is completed, the process flow is finished. The payment process in Step S132 is a usual payment process for paying the fee of the charged electric power from the bank account.

On the other hand, if it cannot be detected in Step S122 that the wire connection is OK, or if it cannot be detected in Step S124 that the output impedance is OK, the process for recording and reporting the abnormal state is performed in Step S134, and the process flow goes promptly to Step S130 in which the power supply switch 504, 720 or 820 is turned off.

Further as described above with reference to FIG. 6, the period after turning on the power supply switch 504, 720 or 820 in Step S120 until turning off the power supply switch 504, 720 or 820 in Step S130 due to such an abnormal state is very short. Therefore, electric power cannot be substantially taken out from the connector 508, 710, 822 or the like, so there is not risk.

In addition, if the attaching of the connection plug cannot be detected in a predetermined time after the removal of the cap in Step S102, or if the special plug cannot be detected in Step S104, the process flow goes to Step S136 in which the process for recording and reporting the abnormal state is performed, and the process flow is finished promptly.

Similarly, if the reception of ID cannot be detected in Step S110, or if the matching of ID cannot be detected in Step S112, or if the matching of password cannot be detected in Step S116, or if it cannot be detected in Step S118 that the payment is OK, the process flow goes to Step S136 in which recording and reporting of the abnormal state is performed, and the process flow is finished promptly. This report is performed for the payment computer 606 and is performed also for the bank system 608 via the payment computer 606 if necessary.

Note that the present invention is not limited to the examples described above, and merits of the present invention can be achieved by other various examples. For instance, although the IGBT 302 is used as the power supply switch 204 in FIG. 4, a power semiconductor device made of silicon carbide (SiC) may be used instead.

Figure 12:
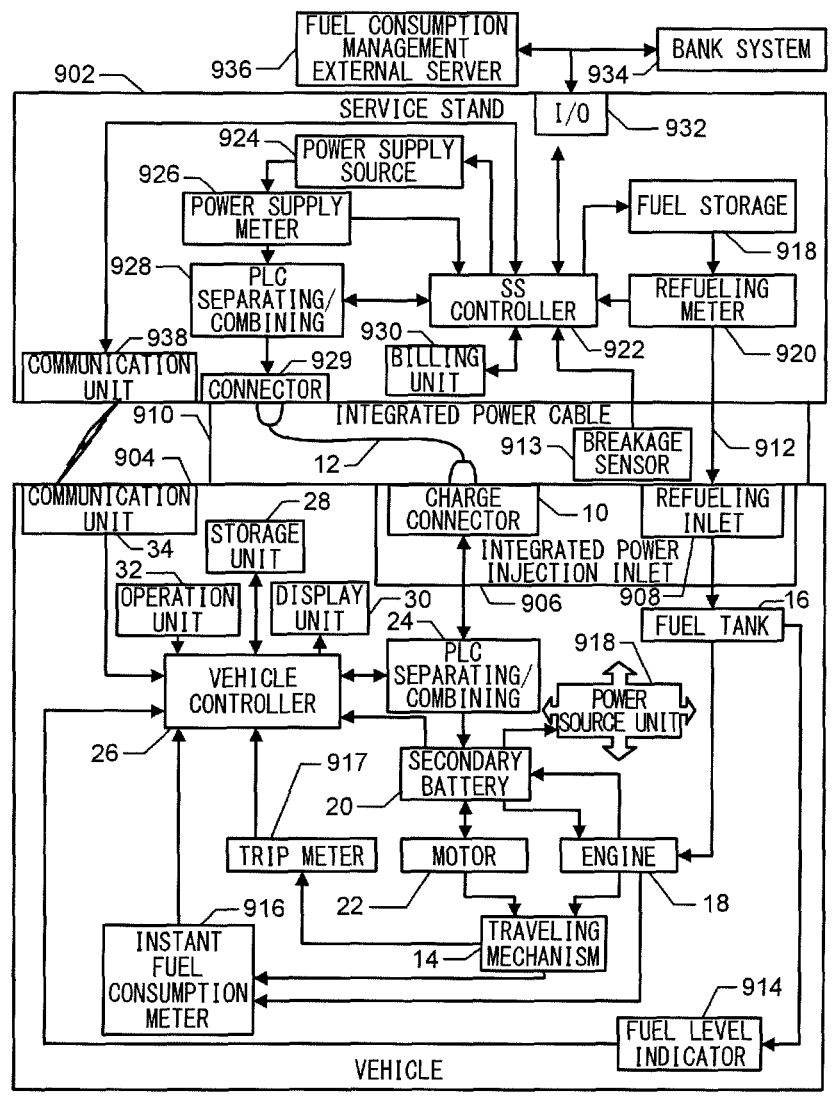
FIG. 12 is a block diagram illustrating Example 3 of a vehicle charge system according to the embodiment of the present invention.

FIG. 12 is a block diagram illustrating Example 3 according to the embodiment of the present invention. Example 3 also constitutes the charge system for a vehicle similar to Examples 1 and 2 described above. In particular, Example 3 has a feature concerning fuel consumption management of a hybrid type vehicle. A part of the feature can be applied to a normal gasoline engine type vehicle without electric charging. FIG. 12 illuminates a block diagram of a service stand 902 that can support electric charging and refueling as well as a hybrid type vehicle 904, so as to describe such a feature. A configuration of the vehicle 904 illustrated in FIG. 12 is the same as that of the vehicle 4 illustrated in FIG. 1, but the elements that are omitted in FIG. 1 are added. Hereinafter these added elements will be mainly described. The elements that are already described in FIG. 1 are denoted by the same numerals, and descriptions thereof are omitted unless necessary.

Although not illustrated in FIG. 1, the vehicle 904 has an integrated power inlet 906 for refueling and/or electric charging in the service stand 902 (hereinafter referred to as "power injection" in general). The charge connector 10 and a refueling inlet 908 are arranged in this integrated power inlet 906 integrally. Note that the integrated power inlet 906 has a layout and a structure for separating between the charge connector 10 and the refueling inlet 908 with a space so as to avoid a flame by spark near the charge connector 10. Further, for the same purpose, the charging does not start until it is confirmed that the charge cable 12 has been securely connected to the charge connector 10. In addition, the charge cable 12 cannot be detached from the charge connector 10 during the charging process.

In the service stand 902, there is provided an integrated power cable 910 that is connected to the integrated power inlet 906. A charge cable 12 and the refueling tube 912 are arranged in the integrated power cable 910. Although the integrated power cable 910 is illustrated like a wide block as a concept in FIG. 12, the actual integrated power cable 910 is a flexible cable in which the charge cable 12 and the refueling tube 912 are arranged. Further, the integrated power cable 910 is provided with a breakage sensor 913 on the periphery so as to prevent a flame from the charge cable 12 to the refueling tube 912 due to a breakage. If the integrated power cable 910 is broken, the breakage sensor 913 detects the breakage before it reaches the inside, and the detection result is sent to a service stand controller 922, which cuts off the power supply to the charge cable 12. The breakage sensor 913 for this purpose includes, for example, a signal line for weak current arranged like a mesh to cover the periphery of the integrated power cable 910 at the shallow layer from the surface thereof. A break in the signal line is detected by the service stand controller 922 so as to decide an occurrence of breakage starting from the outside of the integrated power cable 910.

It is also possible to connect a single charge cable from the outlet unit 6 in the house or the parking lot to the integrated power inlet 906. In this case, the charge cable 12 is solely connected to the charge connector 10 without opening the refueling inlet 908. FIGS. 1 and 8 illuminate this state. The vehicle 904 illustrated in FIG. 12 is equipped with an indicator 914 which detects a fuel level in the fuel tank 16, an instant fuel consumption meter 916 which monitors gasoline injection into the engine 18 and speed information from the traveling mechanism 14 so as to calculate instant fuel consumption, a trip meter 917 based on the traveling mechanism 14, and a power source unit 918 which supplies electric power from the secondary battery 20 to the entire vehicle 904. These units are also provided to the vehicle 4 illustrated in FIG. 1. Pieces of information from the fuel level indicator 914, the instant fuel consumption meter 916 and the trip meter 917 are transmitted to the vehicle controller 26.

Gasoline stored in a fuel storage 918 of the service stand 902 is supplied to the refueling inlet 908 of the vehicle 904 via a refueling meter 920 and the refueling tube 912 by control of a service stand controller 922. Data of refueled amount measured by the refueling meter 920 is sent to the service stand controller 922 and is used for a billing process that will be described later. On the other hand, electric power from a power supply source 924 is supplied to the charge connector 10 of the vehicle 904 via a power supply meter 926, a connector 929 and the charge cable 12 by control of the service stand controller 922. Data of power supply amount measured by the power supply meter 926 is sent to the service stand controller 922 and is used for a billing process that will be described later. A PLC separating/combining unit 928 that is similar to the one described above is disposed between the power supply meter 926 and the connector 929, so that the PLC communication can be performed between the service stand controller 922 and the vehicle controller 26 via the charge cable 12.

When the service stand controller 922 receives refueling data and/or power supply data from the refueling meter 920 and/or the power supply meter 926, the service stand controller 922 transmits the received date to a billing unit 930. The billing unit 930 performs the process of summing up and calculating refueled amount, a gasoline price, a gasoline bill, power supply amount, an electric power fee, and an electric fee bill on the basis of the received data. If there is a carbon dioxide emission trade between the vehicle 904 and the service stand 902, a trade balance thereof is also summed up. This trade information is obtained by the vehicle controller 26 via the communication unit 34 or the charge connector 10 from the service stand 902 and is stored in the storage unit 28. Note that the information about the carbon dioxide emission trade can also be received from the controlling computer 114 of the residential system 66 illustrated in FIG. 2 via the charge cable 12 or the communication unit 34 in the charging process in the house.

The service stand controller 922 outputs process result data of the billing unit 930 from an input and output unit 932 so as to send it to a bank system 934 via the Internet for electronic payment of the gasoline bill and the electric fee bill. In addition, the service stand controller 922 outputs process result data of the billing unit 930 from the input and output unit 932 and sends it to a fuel consumption management external server 936 via the Internet. The fuel consumption management external server 936 further receives information of the trip meter 917 of the vehicle 904 from the vehicle controller 26 via the service stand controller 922 and the Internet. On the basis of these pieces of information, the fuel consumption management external server 936 can calculate the fuel consumption. As the fuel consumption that is calculated, if the refueled amount satisfies fuel consumption calculation condition by a fill-up method, the fuel consumption can be calculated in every refueling. If accumulated number of times of refueling is larger than a predetermined number, accumulated average fuel consumption can be calculated if the refueling is not a fill-up refueling. A process result of the fuel consumption management external server 936 can also be fed back to the vehicle controller 26 via the service stand controller 922. In addition, the fuel consumption management external server 936 also performs a statistical process integrating data from many vehicles, and such statistical data can be fed back to the vehicle controller 26.

On the other hand, the service stand controller 922 combines the process result data of the billing unit 930 with the electric power line by the PLC separating/combining unit 928. Thus, result data of the refueled amount, the gasoline price, the gasoline bill, the power supply amount, the electric power fee, the electric fee bill and the like are transmitted to the vehicle controller 26 from the service stand controller 922. If the refueled amount transmitted in this way matches with the fuel consumption calculation condition by the fill-up method, the vehicle controller 26 divides trip distance data based on the information from the trip meter 917 by the refueled amount data so as to calculate the fuel consumption automatically. The data transmission from the service stand 902 to the vehicle 904 can be performed not only by the PLC communication via the charge cable 12 as described above but also by wireless LAN communication from the communication unit 938 to the communication unit 34. Such the wireless LAN communication is useful in the case where the service stand 902 has not charging function, so that the PLC communication via the charge cable 12 cannot be performed.

Figure 13:
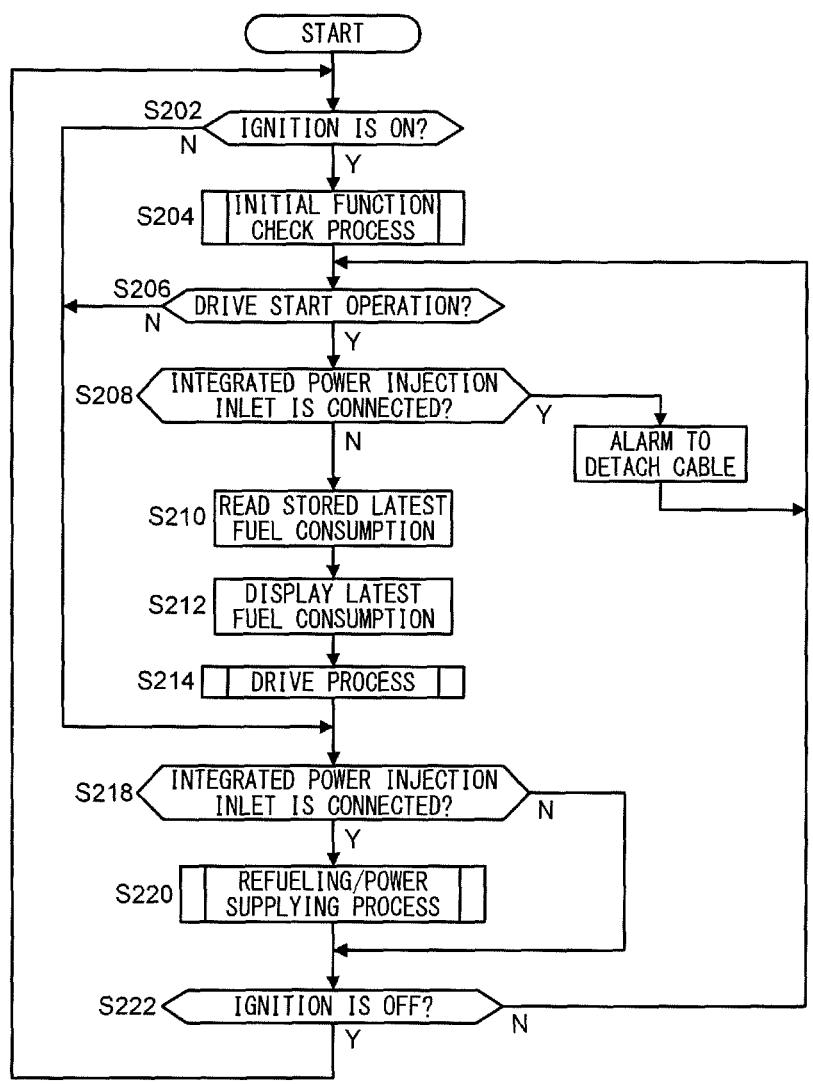
FIG. 13 is a flowchart illustrating an elementary action of a vehicle controller in Example 3.

FIG. 13 is a flowchart illustrating an elementary action of the vehicle controller 26 in Example 3 illustrated in FIG. 12. This process flow starts when the vehicle controller 26 is supplied with power from the secondary battery 20. After that, the operating state is maintained until the power supply from the secondary battery 20 is cut off. As described later, until an ignition is turned on or external connection to the integrated power inlet 906 is made, the process flow waits them without a substantial operation.

When the process flow starts, it is checked in Step S202 whether or not the ignition is turned on. Then, if it is detected that the ignition is turned on, the process flow goes to Step S204 in which an initial function check process of the vehicle 904 is performed. Next, it is checked in Step S206 whether or not a drive start operation of the vehicle 904 is performed. When the drive start operation is detected, the process flow goes to Step S208 in which it is checked whether or not a cable is connected to the integrated power inlet 906. Then, if it is no connected, the process flow goes to Step S210 in which the latest fuel consumption before the drive this time is read from the storage unit 28 and is displayed in Step S212. Note that it is decided that a cable is connected to the integrated power inlet 906 in Step S208 or step 218 that will be described later, not only in the case where the integrated power cable 910 (i.e., both the charge cable 12 and the refueling tube 912) is connected to the integrated power inlet 906 but also in the case where one of the charge cable 12 and the refueling tube 912 is connected. Hereinafter, if it is simply referred to as "cable", it should be understood as described above.

After the above-mentioned process, the process flow goes to Step S214 for drive process. As described above, even if the drive start operation is performed in Step S206, the process flow does not goes to Step S214 for drive process so as to perform the actual drive unless it is confirmed that the cable is not connected to the integrated power inlet 906 in Step S208. This is meaningful to prevent an accident to start the drive with forgetting to detach the cable in the morning after the charging process during the late night with the discount electric fee. Further, if it is detected in Step S208 that the integrated power inlet 906 is connected, the process flow goes to Step S216 in which warning to detach the cable is displayed on the display unit 30, and the process flow goes back to Step S206. Unless the cable is detached in accordance with the warning, the process of Steps S206, S208 and S216 is repeated so that the process flow goes to does not reach Step S214 for the drive process.

Although details of the drive process illustrated in Step S214 bill be described later, this process is finished when the drive is stopped, and the process flow goes to Step S218. Step S218 is provided for checking whether or not a cable is connected to the integrated power inlet 906. If it is not detected in Step S202 that the ignition is turned on, the process flow goes directly to Step S218. In addition, also in the case where the drive start operation is not detected in Step S206, the process flow goes directly to Step S218. In this way, the integrated power inlet connection check is performed in Step S218 regardless of ON/OFF state of the ignition.

If the cable connection to the integrated power inlet 906 is detected in Step S218, the process flow goes to Step S220 for the refueling/power supplying process. Details thereof will be described later. When the refueling/power supplying process is finished, the process flow goes to Step S222 in which it is checked whether or not the ignition is turned off. If it is not turned off, the process flow goes back to Step S206 so as to wait a next drive start operation or the integrated power inlet connection. On the other hand, if it is detected in Step S222 that the ignition is turned off, the process flow goes back to Step S202 so as to wait the next turning on of the ignition or the integrated power inlet connection.

Figure 14:
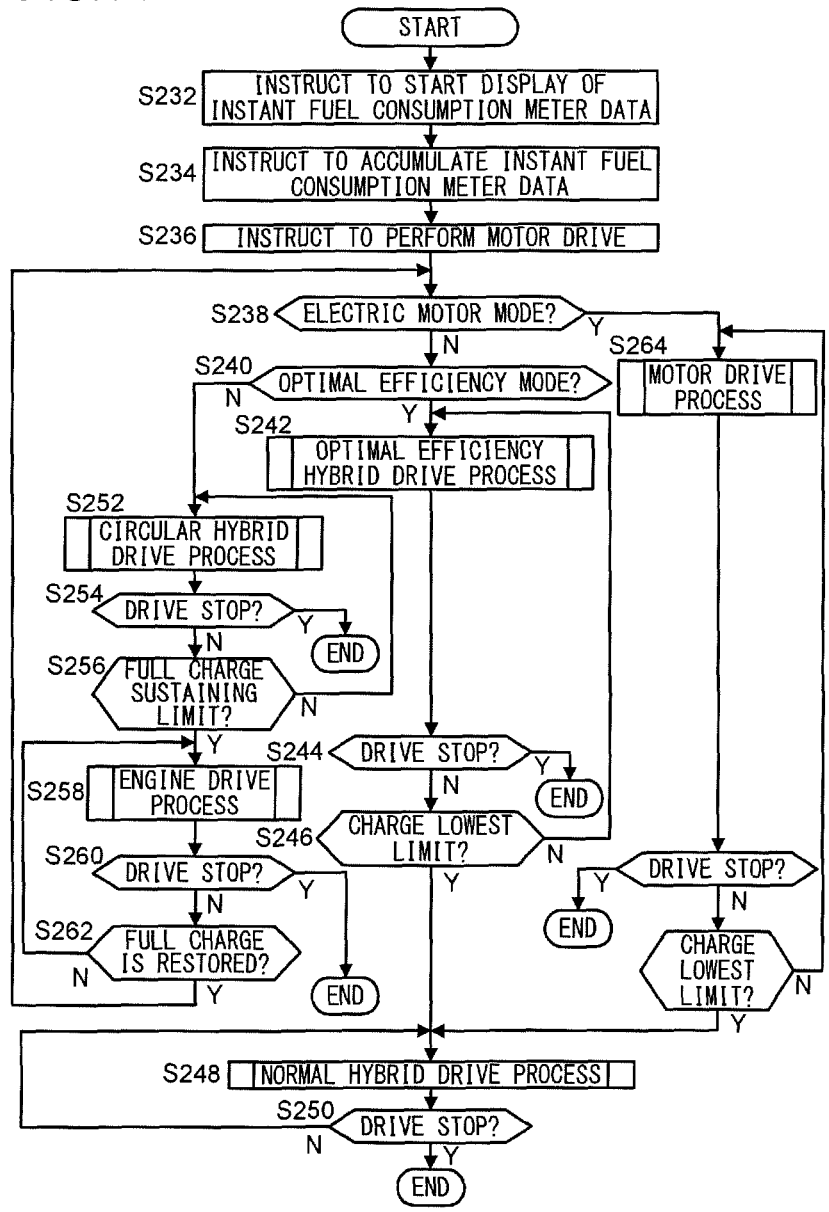
FIG. 14 is a flowchart illustrating details of Step S214 in FIG. 13.

FIG. 14 is a flowchart illustrating details of the drive process in Step S214 of FIG. 13. When the process flow starts, an instruction to start displaying data from the instant fuel consumption meter 916 is issued in Step S232, and an instruction to accumulate data from the instant fuel consumption meter 916 is issued in Step S234. Then, the process flow goes to Step S236 in which an instruction to drive by the motor 22 is issued. Since the vehicle 904 is a hybrid vehicle, the drive by the motor 22 is instructed in the drive start time while efficiency of the engine 18 is bad.

Next, in Step S238, it is checked whether or not the drive mode is set to an electric motor mode. The electric motor mode means an electric vehicle mode in which the vehicle consumes electric power from the secondary battery 20 so as to drive only by the power of the motor 22. If the setting of the electric motor mode is not detected in Step S238, it means that a hybrid mode is set. Therefore, the process flow goes to Step S240 in which it is checked whether or not the drive mode is set to an optimal efficiency hybrid mode. If this mode setting is detected, the process flow goes to Step S242 in which an optimal efficiency hybrid drive process is performed. This process determines whether to use the motor 22 or the engine 18 for driving at each time point with a highest priority of fuel consumption. In other words, assuming that the secondary battery 20 has enough electric power, the motor drive is often selected if the fuel consumption efficiency of the engine drive is bad, so that the secondary battery 20 can be exhausted. Note that the motor counter electromotive force in braking operation can charge the secondary battery 20 in the hybrid drive. Therefore, the charging state of the secondary battery 20 may be restored while driving also in the optimal efficiency hybrid drive depending on a driving state.

Every time when the drive selection at each time point is performed in Step S242, the process flow goes to Step S244 so as to check whether or not the drive is stopped. Then, if the drive is not stopped, the process flow goes to Step S246 in which it is checked whether or not the charge state of the secondary battery 20 has reached a lowest limit. If it is not below the lowest limit, process flow goes back to Step S242, and after that the process from Step S242 to Step S246 is repeated to maintain the optimal efficiency hybrid drive unless the drive is stopped or the lowest limit of the charge state is detected. If the drive stop is detected in Step S244, the drive process illustrated in FIG. 14 is finished at that time point.

On the other hand, if it is detected in Step S246 that the secondary battery 20 is exhausted so that the charge state becomes below the lowest limit, the process flow goes to Step S248 for a normal hybrid drive process. In this process, it is determined to be the engine drive or the motor drive on the basis of the fuel consumption efficiency while the charge amount of the secondary battery 20 is monitored. If the charge amount becomes below the lower limit, the engine drive is selected forcedly and is continued so as to charge the secondary battery 20 until the charge of the secondary battery 20 is restored above the lower limit. Every time when the drive selection of this process is performed, the process flow goes to Step S250 in which it is checked whether or not the drive is stopped. If the drive is not stopped, the process flow goes back to Step S248. After that, the process of Steps S248 and S250 is repeated so as to continue the normal hybrid drive unless the drive stop is detected. In this way, the normal hybrid drive process is a hybrid drive process that is not based on the premise of external charging. If the drive stop is detected in Step S250, the drive process illustrated in FIG. 14 is finished at that time point.

If the setting of the optimal efficiency mode is not detected in Step S240, the process flow goes to Step S252 for a circular hybrid drive process. This process is in common with the normal hybrid drive process in the point of performing the hybrid drive that is not based on the premise of external charging, but is different from the same in the point of performing the hybrid drive while maintaining the full charge state of the electric power charged externally in the plug-in hybrid vehicle for switching to the electric motor mode or the like. In other words, although it is determined to be the engine drive or the motor drive on the basis of the fuel consumption efficiency similarly to the normal hybrid drive process, switching to the engine drive is performed substantially before the charge state of the secondary battery 20 becomes the lowest limit in the step that will be described later.

Every time when the drive selection is performed at each time point in Step S252, the process flow goes to Step S254 in which it is checked whether or not the drive is stopped. Then, if it is not stopped, the process flow goes to Step S256 in which the secondary battery 20 is monitored so as to check whether or not the charge state has reached a full charge sustaining limit. If it is the full charge sustaining limit, the process flow goes back to Step S252. After that, the process from Step S252 to Step S256 is repeated so as to maintain the circular hybrid drive until the drive stop or the full charge sustaining limit is detected. If the drive stop is detected in Step S254, the drive process illustrated in FIG. 14 is finished at time point.

If it is detected in Step S256 that the charge state becomes below the full charge sustaining limit, the process flow goes to Step S258 for the engine drive process so as to select the engine drive forcedly. In this way, in the drive process according to the process flow illustrated in FIG. 14, there are two charging levels of the secondary battery including a first charging level at which the drive mode is switched to the engine drive forcedly in the normal hybrid drive process in Step S248 and a second charging level at which it is decided in Step S256 whether or not to be switched to the engine drive forcedly. These are used selectively on the basis of the mode. As described above, the second charging level is much higher than the first charging level. When the engine drive process in Step S258 is completed, the process flow goes to Step S260 in which it is checked whether or not the drive is stopped. If it is not stopped, the process flow goes to Step S262 in which it is checked whether or not the charge state of the secondary battery 20 is restored to be the full charge. If it is not restored to be the charge, the process flow goes back to Step S258. After that, the process from Step S258 to Step S262 is repeated for maintaining the engine drive process so as to charge the secondary battery 20 until the drive stop or the restoration to the full charge is detected. If the drive stop is detected in Step S254, the drive process illustrated in FIG. 14 is finished at time point.

If the restoration to the full charge is detected in Step S262, the process flow goes back to Step S238. This is for enabling to switch from the full charge state to the electric motor mode or the optimal efficiency mode. In other words, each of these modes is based on the premise that the secondary battery is in the full charge state. When the process flow goes back to Step S238 via Step S258 to Step S262, switching to these modes can be performed. Unless the switching to these modes is performed in Step S238, the process flow goes to Step S252 via Step S238 to Step S240. After that, therefore, unless the drive stop is detected in Step S260, the process of Step S238, Step S240 and Step S252 to Step S262 is repeated so as to continue the hybrid drive while sustaining the secondary battery in substantially the full charge state. If the drive stop is detected in Step S260, the drive process illustrated in FIG. 14 is finished at time point.

If the electric motor mode is detected in Step S238, the process flow goes to Step S264 in which the motor drive is selected forcedly. Then, the process flow goes to Step S266 in which it is checked whether or not the drive is stopped. if it is not stopped, the process flow goes to Step S268 in which it is checked whether or not the charge state of the secondary battery 20 has reached the lowest limit. If the charge state is not below the lowest limit, the process flow goes back to Step S264. After that, the process of Step S264 to Step S268 is repeated so as to continue the motor drive process for charging the secondary battery 20 until the drive stop or the lowest limit charge is not detected. If the drive stop is detected in Step S254, the drive process illustrated in FIG. 14 is finished at time point. On the other hand, if it is detected in Step S246 that the secondary battery 20 is exhausted so that the charge state has become below the lowest limit, the process flow goes to Step S248 for the normal hybrid drive process.

Figure 15:
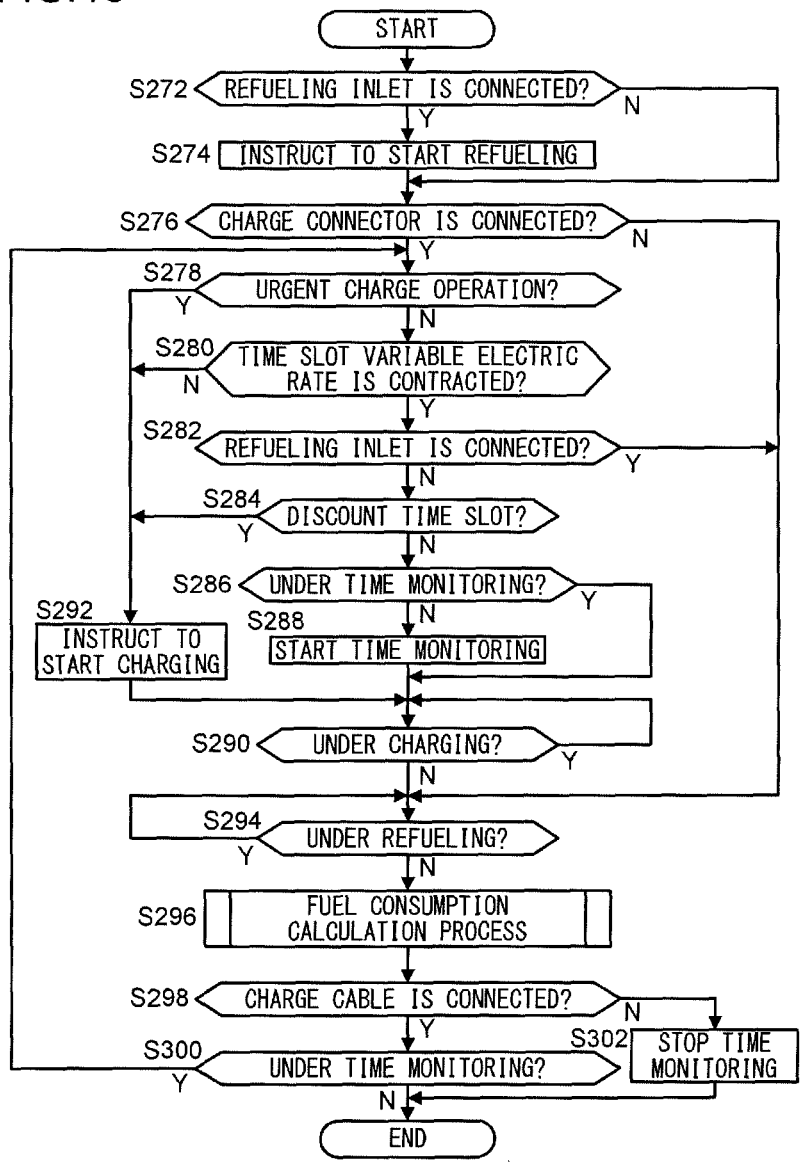
FIG. 15 is a flowchart illustrating details of Step S220 in FIG. 13.

FIG. 15 is a flowchart illustrating details of the refueling/power supplying process of Step S220 in FIG. 13. When the process flow starts, it is checked in Step S272 whether or not there is a connection to the refueling inlet 908. If the connection is detected, it means that either the integrated power cable 910 including the charge cable 12 and the refueling tube 912 or only the refueling tube 912 is connected. Therefore, the process flow goes to Step S274 in which start of refueling is instructed, and the process flow goes to Step S276. On the other hand, if a connection to the refueling inlet 908 is not detected, it means that only the charge cable 12 is connected. Therefore, the process flow goes directly to Step S276.

In Step S276, it is checked whether or not there is a connection to the charge connector 10. If the connection is detected, it means that either the integrated power cable 910 including the charge cable 12 and the refueling tube 912 or only the charge cable 12 is connected. Therefore, the process flow goes to Step S278. In Step S278, it is checked whether or not the urgent charge operation is performed. If this operation is not detected, the process flow goes to Step S280 in which it is checked whether or not the time slot variable electric rate is contracted. If it is detected that the time slot variable electric rate is contracted, it is considered that the charging of the vehicle 904 is intended to be performed from an AC line in the house during the late night. Therefore, the process flow goes to Step S282 in which it is checked whether or not there is a connection to the refueling inlet 908. Then, if there is no connection to the refueling inlet 908, it is considered that the charge cable 12 from the AC line in the house is connected. Therefore, the process flow goes to Step S284.

In Step S284, it is checked whether or not the present time corresponds to the discount time slot. If it is not corresponds, the process flow goes to Step S286 in which it is checked whether or not it is under the time monitoring for detecting the discount time slot to come. Then, if it is not under the time monitoring, this time monitoring is started in Step S288, and the process flow goes to Step S290. Further, if it is detected in Step S286 that it is already under the time monitoring, the process flow goes directly to Step S290. In this way, if a connection to the charge connector 10 is performed when it is not the discount time slot without the urgent charge operation under the contraction of the time slot variable electric rate, it is regarded that the charge cable 12 is connected with an intention to charge during the late night after parking the vehicle in the garage in the house. Therefore, the time monitoring is performed while execution of the charging is suspended until the time comes.

On the other hand, if the urgent charge operation is performed in Step S278, it means that the charging in the service stand 904 or in the house is requested to start promptly regardless of presence or absence of the contraction of the time slot variable electric rate. Therefore, the process flow goes to Step S292 in which start of the charging is instructed, and the process flow goes to Step S290. In addition, also in the case where the contract of the time slot variable electric rate is not detected in Step S280, the process flow goes to Step S292 in which the instruction to start the charging promptly in the service stand 904 or in the house is issued, and the process flow goes to Step S290. Further, also in the case where it is detected in Step S284 that present time corresponds to the discount time slot, the process flow goes to Step S292 in which start of the charging is instructed, and the process flow goes to Step S290.

In Step S290, it is checked whether or not it is under charging. If it is under charging, the process of Step S290 is repeated so as to wait the charge completion. Then, if the process flow goes to Step S290 without performing the charging process like the case via Step S286, or if the process flow goes to Step S290 via Step S292 and the charging is completed, the process flow goes to Step S294. In addition, if a connection to the charge connector 10 is not detected in Step S276, the process flow goes directly to Step S294. Further, if the contract of the time slot variable electric rate is detected in Step S280 and further the connection to the refueling inlet 908 is detected in Step S282, it is considered that there is no intention to charge in the service stand 902. Therefore, the process flow goes promptly to Step S294.

In Step S294, it is checked whether or not it is under refueling. If it is under refueling, the process of Step S294 is repeated so as to wait completion of the refueling. Then, if the process flow goes to Step S294 without a refueling start instruction in Step S274, or if the process flow goes to Step S294 via Step S274 in which refueling start instruction is issued and the refueling is completed, the process flow goes to Step S296. In Step S296, the fuel consumption calculation process is performed. Details thereof will be described later.

Next, in Step S298, it is checked whether or not a cable is connected to the charge connector 10. If it is connected, it is checked in Step S300 whether or not it is under the time monitoring. If it is under the time monitoring, the process flow goes back to Step S278. After that, the process from Step S278 to Step S290 and from Step S294 to Step S300 is repeated until the urgent charge operation is detected in Step S278 or until it is detected in Step S284 that the present time corresponds to the discount time slot. Further, if it is not detected in Step S300 that it is under the time monitoring, or if it is detected in Step S298 that the cable is detached, the process flow of the refueling/power supplying process illustrated in FIG. 15 is finished.

Figure 16:
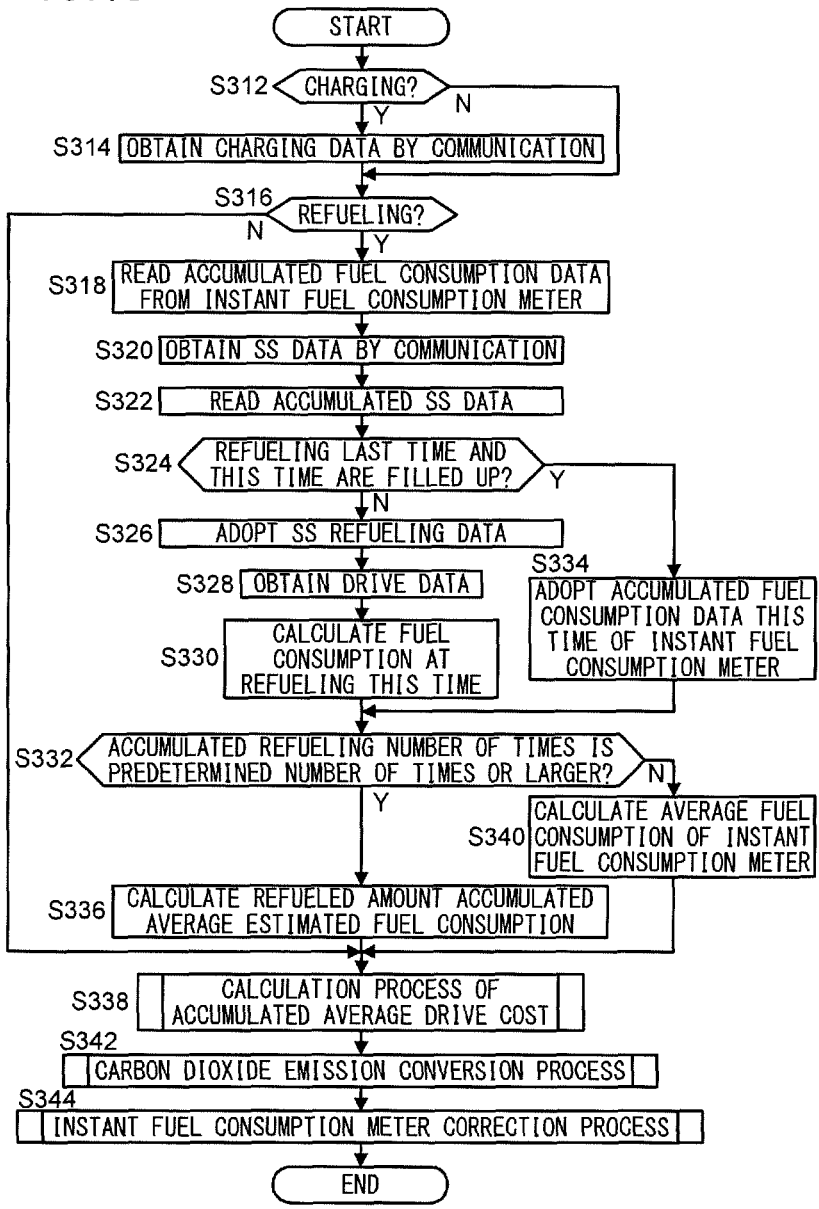
FIG. 16 is a flowchart illustrating details of Step S296 in FIG. 15.

FIG. 16 is a flowchart illustrating details of the refueling/power supplying process in Step S296 of FIG. 15. When the process flow starts, it is checked in Step S312 whether or not the charging has been performed. Then, if the charging has been performed, the process flow goes to Step S314 in which charging data including the charge amount, the electric power fee, the electric fee bill and the like is obtained from the service stand controller 922 by the PLC communication or the wireless LAN communication, and the process flow goes to Step S316. Note that if it is not detected in Step S312 that the charging has been performed, the process flow goes directly to Step S316.

In Step S316, it is checked whether or not the refueling has been performed. If the refueling has been performed, the process flow goes to step 318 in which fuel consumption accumulated data of the instant fuel consumption meter 916 from the last refueling to the refueling this time is read out. Further, in S320, service stand data concerning the refueling this time such as a refueled amount, presence or absence of full refueling, a gasoline price, the gasoline bill and the like is obtained by the PLC communication or the wireless LAN communication. Next, in Step S322, accumulated service stand data concerning the refueling obtained until the last time is read out from the storage unit 28, and the process flow goes to Step S324.

In Step S324, it is checked whether or not both the refueling the last time and the refueling this time were performed to fill up, on the basis of data obtained in Step S320 and Step S322. If it is true, the fuel consumption calculation by the fill-up method can be performed. Therefore, the process flow goes to Step S326 in which data of the refueled amount this time obtained in Step S320 is adopted, and the process flow goes to Step S328. In Step S328, drive data from the last refueling time to this refueling time is obtained from the trip meter 917. Further, in Step S330, the fuel consumption at this refueling time is calculated from the refueled amount this time and a drive distance this time, and the process flow goes to Step S332. On the other hand, if it is not detected in Step S324 that both the refueling the last time and the refueling this time were performed to fill up, the process flow goes to Step S334 in which accumulated fuel consumption data from the refueling the last time to the refueling this time is adopted from the fuel consumption data of the instant fuel consumption meter 916 obtained in Step S318 is adopted, and the process flow goes to Step S332.

In step 332, it is checked whether or not the accumulated refueling number of times until this time is a predetermined number of times (e.g., 10 times) or larger. If it is true, the process flow goes to Step S336 in which average estimated fuel consumption is calculated from the accumulated drive distance until this time and the accumulated refueled amount, and the process flow goes to Step S338. This is because that refueled amount can be regarded as consumed amount without substantial error if the accumulated refueled amount is sufficiently larger than capacity of the fuel tank 16. On the other hand, if the accumulated refueling number of times is smaller than the predetermined number of times in Step S332, the process flow goes to Step S340 in which average fuel consumption until this time is calculated from the data of the instant fuel consumption meter 916, and the process flow goes to Step S338. This is because that if the refueling number of times is small, it is more reasonable to estimate the average fuel consumption on the basis of data of the instant fuel consumption meter 916 than to estimate the average fuel consumption from a result of the refueled amount. Further, if it is not detected in Step S316 that the refueling has been performed, the process flow goes to Step S338 promptly.

In Step S338, a process of calculating accumulated drive cost for a predetermined distance (e.g., 10 kilometers) is performed. Details thereof will be described later. Next, in Step S342, a process converting the consumed energy into carbon dioxide emission is performed. Details thereof will also be described later. Further, in Step S344, a process of correcting the instant fuel consumption meter 916 on the basis of a result of the refueling and a result of the drive is performed, and the process flow is finished. The process of correcting the instant fuel consumption meter in Step S344 will also be described later.

Further, although the decision that the accumulated refueled amount is sufficiently larger than a capacity of the fuel tank 16 is performed depending on the refueling number of times in Step S332. However, it is possible instead to decide directly whether or not the accumulated refueled amount becomes above a predetermined amount. In addition, instead of decision by the accumulated refueled amount, it is possible to check in Step S332 whether or not the accumulated drive distance has reached a predetermined distance or longer. By either of them, it is possible to decide whether the refueled amount accumulated average estimated fuel consumption is adopted or the instant fuel consumption meter average fuel consumption is adopted.

Figure 17:
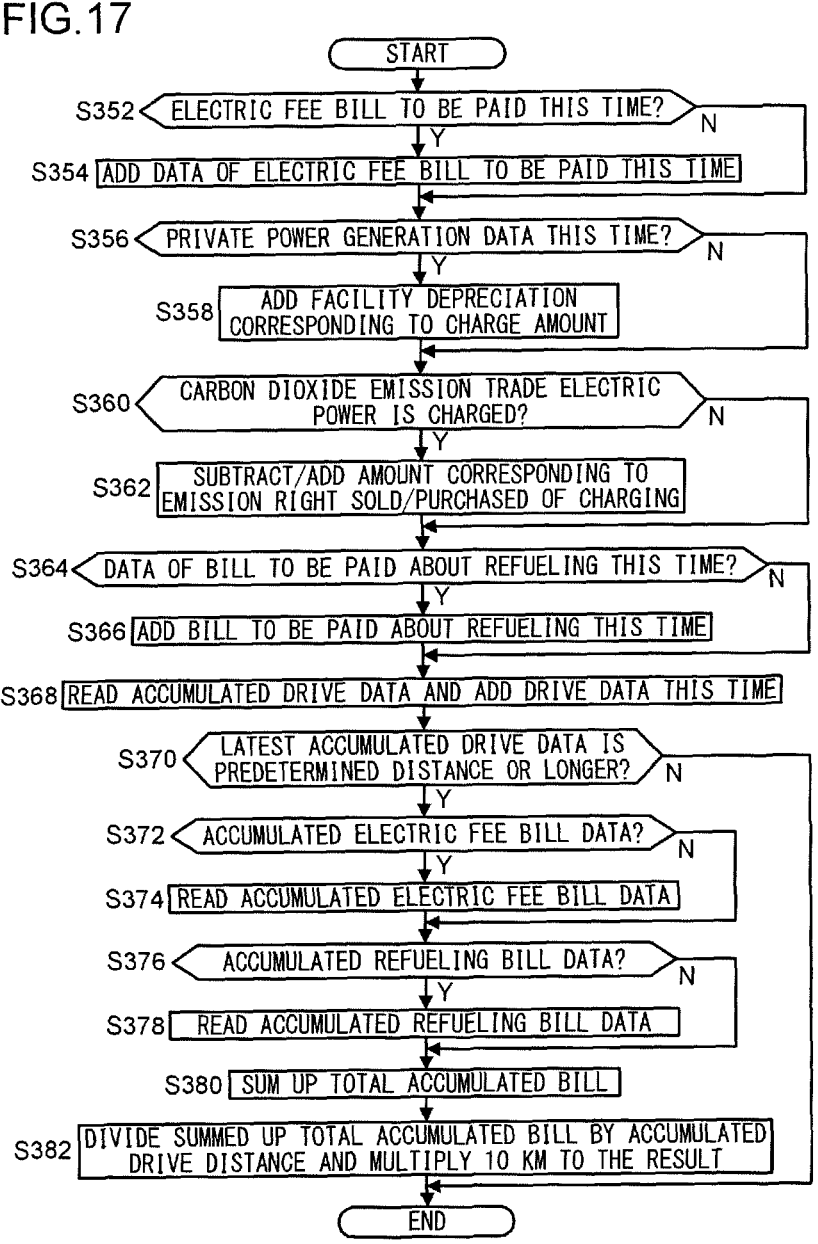
FIG. 17 is a flowchart illustrating details of Step S338 in FIG. 16.

FIG. 17 is a flowchart illustrating details of the process of calculating the accumulated drive cost in Step S338 of FIG. 16. When the process flow starts, it is checked whether or not there is an electric fee bill to be paid about the charging this time in Step S352. If there is the electric fee bill to be paid this time, data of the electric fee bill to be paid this time is added in Step S354, and the process flow goes to Step S356. On the contrary, if there is no electric fee bill to be paid this time in Step S352, the process flow goes directly to Step S356. In Step S356, it is checked whether or not private power generation data is included in the charging this time. If the private power generation data is included, charging facility depreciation corresponding to the charge amount is added in Step S358, and the process flow goes to Step S360. On the contrary, if the private power generation data is not included in the charging this time in Step S356, the process flow goes directly to Step S360.

In Step S360, it is checked whether or not electric power concerning the carbon dioxide emission trade is charged this time. If it is true, the process flow goes to Step S362. In Step S362, if carbon dioxide emission right is sold, the sold price is subtracted, while if the carbon dioxide emission right is purchased, the purchased price is added, and the process flow goes to Step S364. On the other hand, if no carbon dioxide emission trade is related to the charging this time in Step S360, the process flow goes directly to Step S364. In Step S364, it is checked whether or not there is a refueling bill to be paid concerning the refueling this time. If there is the bill, data of bill to be paid about refueling this time is added in Step S366, and the process flow goes to Step S368. On the contrary, if there is no electric fee bill to be paid this time in Step S364, the process flow goes directly to Step S368.

In Step S368, the accumulated drive data up to this time is read from the trip meter 917, and the drive data this time is added to the read data. Next, in Step S370, it is checked whether or not the latest accumulated drive data as the above-mentioned result is a predetermined distance or longer. Then, if it is the predetermined distance or longer, it is checked in Step S372 whether or not there is an accumulated electric fee bill data up to this time. If there is the data, the process flow goes to Step S374 in which the accumulated electric fee bill data is read out from the storage unit 28, and the process flow goes to Step S376. On the other hand, if there is no accumulated electric fee bill data in Step S372, the process flow goes directly to Step S376. In Step S376, it is checked whether or not there is accumulated refueling bill data up to this time. If there is the data, the process flow goes to Step S378 in which the accumulated refueling bill data is read out from the storage unit 28, and the process flow goes to Step S380. On the contrary, if there is no accumulated refueling bill data in Step S376, the process flow goes directly to Step S380.

In Step S380, the accumulated electric fee bill data up to this time read out in Step S374 and the accumulated refueling bill data up to this time read out in Step S378 are summed up so that the total accumulated bill is calculated. Then, the process flow goes to Step S382 in which the summed up total accumulated bill up to this time obtained in Step S380 is divided by the accumulated drive data up to this time obtained in Step S368 and multiplies 10 km so that accumulated average drive cost per 10 km is calculated, and the process flow is finished. Further, if it cannot be detected in Step S370 that the latest accumulated drive data is the predetermined distance or longer, the process flow is finished promptly. Unless the accumulated drive distance is sufficiently longer than a distance that the vehicle can drive by one energy supply, the error is too large to regard the supplied energy amount such as the refueled amount or the charge amount as the consumed energy amount. Therefore, it is not appropriate to calculate the drive cost from the payment bill for the supplied energy.

Note that it is checked whether or not the accumulated drive distance is the predetermined or longer in Step S370, and the meaning thereof is to decide that the accumulated refueled amount is sufficiently larger than the capacity if the fuel tank 16 similarly to Step S332 in FIG. 16 as long as the refueling is accompanied. Therefore, unless the vehicle 904 drives only by the electric power, Step S370 may be the step of deciding whether or not the refueling number of times has reached a predetermined number of times or the step of deciding whether or not the accumulated refueled amount itself has reached a predetermined amount or larger. By either of them, it is possible to decide whether or not the calculation of the drive cost is appropriate.

Figure 18:
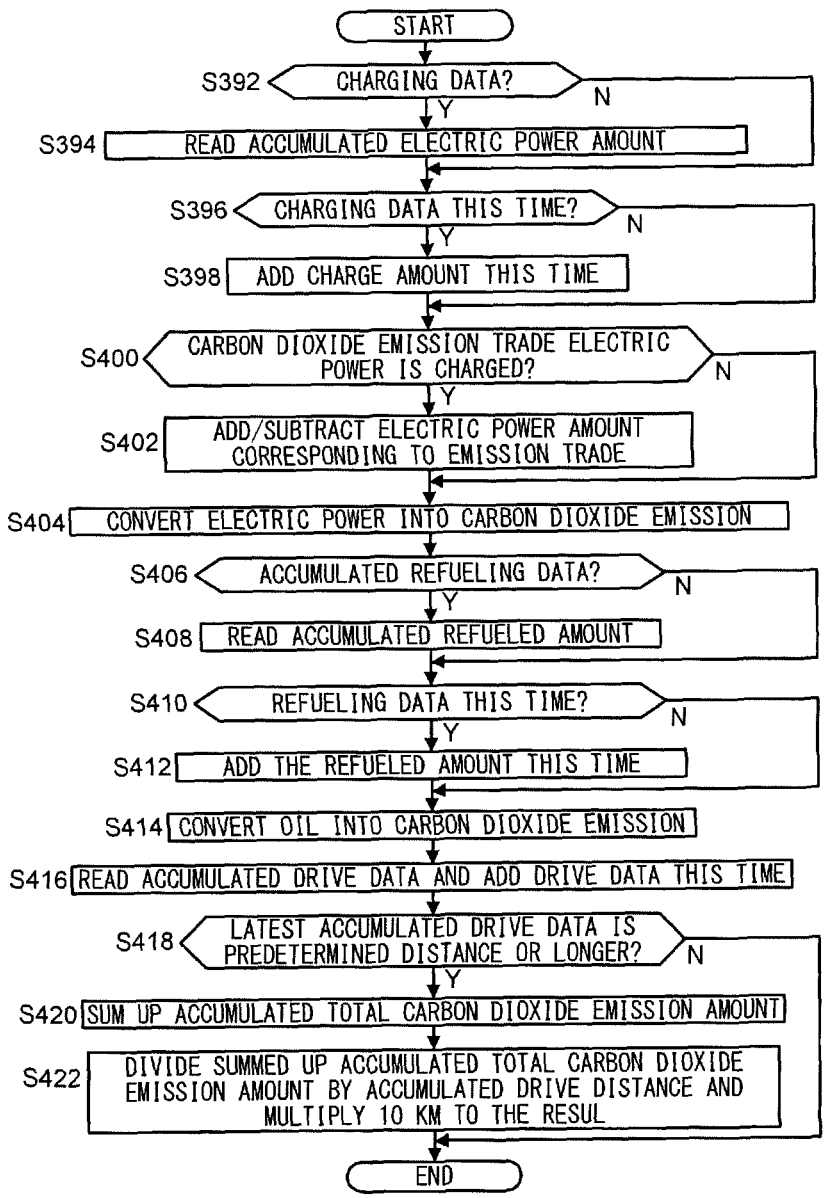
FIG. 18 is a flowchart illustrating details of Step S342 in FIG. 16.

FIG. 18 is a flowchart illustrating details of a carbon dioxide emission conversion process in Step S342 of FIG. 16. When the process flow starts, it is checked whether or not the storage unit 28 stores the charging data in Step S392. If the storage unit 28 stores the charging data, a past accumulated electric power amount is read out from the storage unit 28 in Step S394, and the process flow goes to Step S396. On the contrary, if the storage unit 28 does not store the charging data in Step S392, the process flow goes directly to Step S396. In Step S396, it is checked whether or not there is charging data this time. If there is charging data this time, the charge amount this time is added in Step S398, and the process flow goes to Step S400. On the contrary, if there is no charging data this time in Step S396, the process flow goes directly to Step S400.

In Step S400, it is checked whether or not the electric power concerning the carbon dioxide emission trade is charged this time. If it is true, the process flow goes to Step S402. In Step S402, if the carbon dioxide emission right is sold, the electric power amount corresponding to the sold price is added, while if the carbon dioxide emission right is purchased, the electric power amount corresponding to the purchased price is subtracted, and the process flow goes to Step S404. On the other hand, if the carbon dioxide emission trade is not related to the charging this time in Step S400, the process flow goes directly to Step S404. In step S404, a charged electric power amount during a predetermined period based on the process from Step S392 to Step S402 is converted into a carbon dioxide emission amount on the basis of a predetermined conversion equation for converting an electric power consumed amount into a carbon dioxide emission amount.

Next, it is checked whether or not the storage unit 28 stores accumulated refueling data in Step S406. If the storage unit 28 stores the data, a past accumulated refueled amount is read out from the storage unit 28 in Step S408, and the process flow goes to Step S410. On the contrary, if the storage unit 28 does not store the accumulated refueling data in Step S406, the process flow goes directly to Step S410. In Step S410, it is checked whether or not there is refueling data this time. If there is the data, the refueled amount this time is added in Step S412, and the process flow goes to Step S412. On the contrary, if there is no refueling data this time in Step S410, the process flow goes directly to Step S414. In step S414, an accumulated refueled amount up to this time based on the process from Step S406 to Step S412 is converted into a carbon dioxide emission amount on the basis of a predetermined conversion equation for converting oil consumed amount into a carbon dioxide emission amount.

Next, in Step S416, accumulated drive data up to this time is read out from the trip meter 917, and the drive data this time is added. Then, in Step S418, it is checked whether or not the latest accumulated drive data as the above-mentioned result is a predetermined distance or longer. If the latest accumulated drive data is the predetermined distance or longer, the carbon dioxide emission amount converted from the charge amount in Step S404 and the carbon dioxide emission amount converted from the refueled amount in Step S414 are summed up in Step S420, so that an accumulated total carbon dioxide emission amount up to this time is calculated.

Next, the process flow goes to Step S422 in which the accumulated total carbon dioxide emission amount summed up value up to this time obtained in Step S420 is divided by the accumulated drive data up to this time obtained in Step S416, and 10 km is multiplied so that an estimated average carbon dioxide emission amount per 10 km is calculated, and the process flow is finished. Further, if it cannot be detected in Step S416 that the latest accumulated drive data is a predetermined distance or longer, the process flow is finished promptly. Unless the accumulated drive distance is sufficiently longer than a distance that the vehicle can drive by one energy supply, the error is too large to regard the supplied energy amount such as the refueled amount or the charge amount as the consumed energy amount. Therefore, it is not appropriate to calculate the average carbon dioxide emission amount from a carbon dioxide emission conversion value of the supplied energy.

Note that it is checked whether or not the accumulated drive distance is the predetermined or longer in Step S416 similarly to Step S370 in FIG. 17, and the meaning thereof is to decide that the accumulated refueled amount is sufficiently larger than the capacity if the fuel tank 16 similarly to Step S332 in FIG. 16 as long as the refueling is accompanied. Therefore, unless the vehicle 904 drives only by the electric power, Step S416 may be the step of deciding whether or not the refueling number of times has reached a predetermined number of times or the step of deciding whether or not the accumulated refueled amount itself has reached a predetermined amount or larger. By either of them, it is possible to decide whether or not the calculation of the drive cost is appropriate.

FIG. 19 is a flowchart illustrating details of an instant fuel consumption meter correction process in Step S344 of FIG. 16. When the process flow starts, it is checked in Step S432 whether or not there is refueling data. If there is the refueling data, the process flow goes to Step S434 in which the accumulated drive data up to this time is read out from the trip meter 917, and the drive data this time is added to the read data. Then, in Step S436, it is checked whether or not the latest accumulated drive data as the above-mentioned result is a predetermined distance or longer. If the latest accumulated drive data is a predetermined distance or longer, the accumulated refueling data up to this time in read out from the storage unit 28 in Step S438, and the drive data this time is added to the read data so as to update the same to the latest data. Then, in Step S440, the refueled amount accumulated average estimated fuel consumption is calculated from the latest accumulated refueled amount data and the latest accumulated refueled amount data.

Next, in Step S442, the average fuel consumption is calculated on the basis of data from the instant fuel consumption meter 916 for the corresponding period. Then, in Step S444, the instant fuel consumption meter average fuel consumption and the refueled amount accumulated average estimated fuel consumption are compared with each other so that it is checked whether or not a difference between them is a predetermined value or larger in Step S446. If the difference is a predetermined value or larger, the process flow goes to Step S448 in which the instant fuel consumption meter correction process is performed, and the process flow is finished. In the instant fuel consumption meter correction process of Step S448, the instant fuel consumption data from the instant fuel consumption meter 916 is corrected so that the instant fuel consumption meter average fuel consumption becomes equal to the refueled amount accumulated average estimated fuel consumption as a base. In other words, if the instant fuel consumption meter average fuel consumption is too high, the output of the instant fuel consumption meter 916 is corrected so that data of the instant fuel consumption meter 916 becomes lower after that. If the instant fuel consumption meter average fuel consumption is too low, the output of the instant fuel consumption meter 916 is corrected so that data of the instant fuel consumption meter 916 becomes higher after that.

On the other hand, if it is not detected that the difference is a predetermined value or larger in step S446, the instant fuel consumption meter correction process is not performed, and the process flow is finished promptly. In addition, if it is not detected in Step S432 that there is refueling data, or if it is not detected in Step S436 that the latest accumulated drive data is a predetermined distance or longer, it is not appropriate to perform the instant fuel consumption meter correction process in either case. Therefore, the process flow is finished promptly.

Note that it is checked whether or not the accumulated drive distance is a predetermined distance or longer in Step S436 similarly to Step S370 in FIG. 17, and the meaning thereof is to decide that the accumulated refueled amount is sufficiently larger than the capacity if the fuel tank 16 similarly to Step S332 in FIG. 16. Therefore, Step S436 may be the step of deciding whether or not the refueling number of times has reached a predetermined number of times or the step of deciding whether or not the accumulated refueled amount itself has reached a predetermined amount or larger. By either of them, it is possible to decide whether or not it is appropriate to enter the instant fuel consumption meter correction process.

In Example 3 described above, the control process of the refueling and the power supply is performed on the vehicle 904 side, but the present invention is not limited to this embodiment. For instance, a process similar to the refueling/power supplying process illustrated in FIG. 15 may be performed not by the vehicle controller 26 but by the service stand controller 922. In this case, the detection of the connection to the refueling inlet 908 or the charge connector 10, and the urgent charge operation should also be performed on the service stand 902 side. In addition, the decision in Step S280 whether or not the time slot variable electric rate is contracted concerning the vehicle is performed on the basis of contract information received from the vehicle 904.

Hereinafter, various technical features described above will be summarized.

First, a first technical feature disclosed in this specification is related to a charge system for a vehicle.

Electric vehicles and plug-in hybrid vehicles are in a studying stage for a practical use, and a charge system for such a vehicle is studied variously in Patent Document 1, Patent Document 2 and the like as described above.

However, in order to provide a practical charge system so that electric vehicles and plug-in hybrid vehicles become widespread, there are still many problems that remain to be solved.

Therefore, this specification discloses a first technical feature so as to provide a practical charge system for a vehicle so that vehicles using electricity can be widely available.

Specifically, as an example of the first technical feature, this specification discloses a charge system for a vehicle including a power supply unit which outputs electric power to a vehicle having a battery, a power supply switching unit which determines whether or not to supply electric power to the power supply unit, and a controller which controls the power supply switching unit to disable the power supply to the power supply unit unless it is detected that the vehicle is connected to the power supply unit correctly.

In order to achieve the wide-spread use of vehicles using electricity, it is necessary to provide fast charging and easy charging, but devices for realizing such charging and a risk of occurrence of an accident have a trade-off relationship. The feature disclosed in this specification adjusts the relationship by disabling the power supply to the power supply unit unless it is detected that the vehicle is connected to the power supply unit correctly.

In addition, as a specific example of the first technical feature described above, this specification discloses a configuration in which the power supply switching unit is supplied with electric power from a single phase three-line electric power line including a first outside line, a second outside line and a neutral line, and supplies high voltage electric power to the power supply unit from between the first outside line and the second outside line.

Thus, it is possible to realize fast charging of the vehicle with high voltage of 200 volts or the like by using the single phase three-line electric power line that is widely available in houses while managing the 200 volts power source posing a risk of electrocution.

In addition, as a further specific example of the first technical feature described above, this specification discloses a configuration in which the controller can receive electric power supply of a low voltage of normal 100 volts or the like from between the neutral line and one of the first outside line and the second outside line.

In addition, as another specific example of the first technical feature described above, this specification discloses a configuration in which the controller controls the power supply switching unit not to supply electric power to the power supply unit unless it is detected that wire connection via the power supply unit is normal. Thus, it is possible to prevent the power supply unit from being applied with a voltage unexpectedly.

In addition, as another specific example of the first technical feature described above, this specification discloses a configuration in which the controller controls the power supply switching unit not to supply electric power to the power supply unit unless it is detected that an output impedance of the power supply unit is normal. Thus, it is possible to prevent the power supply unit from supplying power to inappropriate equipment that is not expected.

In addition, as another specific example of the first technical feature described above, this specification discloses a configuration in which the controller controls the power supply switching unit not to supply electric power to the power supply unit unless it is detected that a connector having a predetermined shape is connected to the power supply unit. This feature also prevents the power supply unit from supplying power to inappropriate equipment that is not expected.

In addition, as another specific example of the first technical feature described above, this specification discloses a configuration in which the controller controls the power supply switching unit not to supply electric power to the power supply unit unless it is detected that an uncharged vehicle is connected to the power supply unit. This feature also prevents the power supply unit from being applied with a voltage unexpectedly.

In addition, as another specific example of the first technical feature described above, this specification discloses a configuration in which the controller controls the power supply switching unit not to supply electric power to the power supply unless the vehicle to be connected to the power supply unit is specified. Thus, it is possible to prevent the power supply unit from being applied with a voltage unexpectedly, and theft of electricity can be prevented even if the garage is located outdoors.

In addition, as another specific example of the first technical feature described above, this specification discloses a configuration in which the controller controls the power supply switching unit not to supply electric power to the power supply unit unless the vehicle that is connected to the power supply unit is authenticated. Thus, it is possible to prevent theft of electricity even if the garage is located outdoors.

In addition, as another specific example of the first technical feature described above, this specification discloses a configuration in which the controller starts automatically to detect whether or not a vehicle is correctly connected to the power supply unit by connection of the vehicle to the power supply unit. Thus, the power supply becomes easy so as to contribute to wide-spread use of vehicles using electricity together with the features described above.

In addition, as another specific example of the first technical feature described above, this specification discloses a configuration in which the controller detects automatically whether or not a vehicle is correctly connected to the power supply unit when the start time of charging to the power supply unit comes. This feature also facilitates the power supply and can contribute to wide-spread use of vehicles using electricity together with the features described above.

In addition, as another specific example of the first technical feature described above, this specification discloses a configuration in which it is detected whether or not a vehicle is correctly connected to the power supply unit by power cable communication via the power supply unit. Thus, power supply and communication for procedure about the power supply are facilitated, and it is possible to contribute to wide-spread use of vehicles using electricity together with the features described above.

In addition, as a further specific example of the first technical feature described above, this specification discloses a configuration that the switching unit enables the communication signal superimposed for the power cable communication to be transmitted via the power supply unit regardless of whether or not the electric power is supplied. Thus, the power supply control can be performed without a trouble of the power cable communication.

In addition, as another specific example of the first technical feature described above, this specification discloses a configuration in which the controller detects whether or not a vehicle is correctly connected to the power supply unit by wireless communication with the vehicle. This feature also facilitates the power supply and communication for procedure of the power supply.

In addition, as another specific example of the first technical feature described above, this specification discloses a charge system for a vehicle including a power supply unit which outputs electric power to a vehicle having a battery, a detection unit which detects a start condition of power supply from the power supply unit to a vehicle, a power supply switching unit which determines whether or not to supply electric power to the power supply unit, and a controller for the power supply switching unit which starts the power supply when the detection unit detects the power supply start condition if time slot variable electric rate is not contracted while the start of the power supply is suspended until the time slot comes if time slot variable electric rate is contracted even if the detection unit detects the power supply start condition.

Thus, economical merits of the vehicle using electricity can be utilized without being bothered by procedures or operations.

Next, the second technical feature disclosed in this specification is also related to a charge system for a vehicle.

As described above, electric vehicles and plug-in hybrid vehicles are in a studying stage for a practical use, and a charge system for such a vehicle is studied variously in Patent Document 1, Patent Document 2 and the like as described above.

However, in order to provide a practical charge system so that electric vehicles and plug-in hybrid vehicles become widespread, there are still many problems that remain to be solved.

Therefore, this specification discloses a second technical feature so as to provide a practical charge system for a vehicle so that vehicles using electricity can be widely available Specifically, as an example of the second technical feature, this specification discloses a charge system for a vehicle including a power supply unit which supplies electric power for charging a vehicle having a battery, and a communication unit which performs communication with this vehicle.

In this way, by connecting between the charge system and the vehicle with double relationships of charging and communication, the charge system and the vehicle are integrated so that various in convenience can be avoided, and a charge system having many practical merits can be realized.

In addition, as a specific example of the second technical feature described above, this specification discloses a configuration in which the electric power line from the power supply unit is connected to the power supply unit so that electric power for charging the vehicle is output, and there is provided a separating/combining unit which separates and combines communication signal of the communication unit from and with the electric power line so as to perform power cable communication with the vehicle via the power supply unit. Thus, communication with the vehicle can be performed only by connecting the charge cable to the vehicle.

In addition, as another specific example of the second technical feature described above, this specification discloses a configuration including a wireless transmission/reception unit for communicating with the vehicle a communication signal. Thus, communication with the vehicle can be performed regardless of whether or not the charge cable is connected.

In addition, as another specific example of the second technical feature described above, this specification discloses a configuration in which the communication unit transmits vehicle information to the charge system. Thus, for example, charging state information of the secondary battery on the vehicle side can be transmitted to the charge system, and further an ID and a password of the vehicle can be transmitted so as to certify that the vehicle is qualified to be charged.

In addition, as another specific example of the second technical feature described above, this specification discloses a configuration in which the communication unit transmits an instruction from the charge system to the vehicle. Thus, a request to send an ID and a password can be performed, so as to handle the vehicle as external equipment of the charge system.

In addition, as another specific example of the second technical feature described above, this specification discloses a configuration in which the communication unit transmits an instruction from the vehicle to the charge system. Thus, an instruction concerning the charging can be transmitted from the vehicle to the charge system, and further a signal for operating a facility such as an illumination in the garage in which the charge system is installed can be transmitted.

In addition, as another example of the second technical feature described above, this specification discloses a charge system for a vehicle including a single phase three-line electric power line having a first outside line, a second outside line and a neutral line, a power supply unit which outputs a high voltage electric power from between the first outside line and the second outside line so as to charge a vehicle having a battery, and an illumination unit which is supplied with a low voltage electric power from between the neutral line and one of the first outside line and the second outside line so as to illuminate the vehicle.

Thus, it is possible to obtain a charge system that can perform fast charging and enables to use ordinary illumination equipment.

In addition, as a specific example of the second technical feature described above, this specification discloses a configuration including a vehicle storage mechanism that is driven by a low voltage electric power supplied from between the neutral line and one of the first outside line and the second outside line. Thus, a charge system that can perform fast charging and can use a vehicle storage mechanism driven by an ordinary voltage.

In addition, as another specific example of the second technical feature described above, this specification discloses a configuration including a handy illumination unit which is supplied with a low voltage electric power from between the neutral line and one of the first outside line and the second outside line so as to illuminate the vicinity of the power supply unit. Thus, fast charging can be performed while handy illumination for the charging can be performed at night.

In addition, as another specific example of the second technical feature described above, this specification discloses a configuration including a display unit which is supplied with a low voltage electric power from between the neutral line and one of the first outside line and the second outside line so as to display information about charging. Thus, fast charging can be performed while information about charging can be displayed on the display unit that can be driven by an ordinary voltage.

In addition, as another example of the second technical feature described above, this specification discloses a charge system for a vehicle including an electric power line, a power supply unit which outputs electric power from the electric power line so as to charge a vehicle having a battery, a private power generation system which supplies electric power to the electric power line without carbon dioxide emission, and a notifying unit which notifies a relationship between electric power amount consumed via the power supply unit and electric power amount generated by the private power generation system.

Thus, the vehicle can be used while understanding its contribution to the natural environment by the combination of the vehicle having a battery and the private power generation system.

In addition, as a specific example of the second technical feature described above, this specification discloses a configuration including a service wire which supplies ordinary electric power to the electric power line externally, in which the power supply unit can output electric power for charging the vehicle from either one of the electric power from this service wire and the electric power from the private power generation system.

According to the above-mentioned feature, even in the case where the vehicle can be supplied with electric power purchased from the service wire, the vehicle can be used while understanding its contribution to the natural environment.

In addition, as another specific example of the second technical feature described above, this specification discloses a configuration in which the notifying unit converts the relationship between the electric power amount consumed via the power supply unit and the electric power amount generated by the private power generation system into a carbon dioxide emission amount and notifies the result. Thus, it is possible to perceive the contribution to the natural environment.

Next, a third technical feature disclosed in this specification is also related to a charge system for a vehicle.

As described above, electric vehicles and plug-in hybrid vehicles are in a studying stage for a practical use, and a charge system for such a vehicle is studied variously in Patent Document 1, Patent Document 2 and the like as described above.

However, in order to provide a practical charge system so that electric vehicles and plug-in hybrid vehicles become widespread, there are still many problems that remain to be solved.

Therefore, this specification discloses a third technical feature so as to provide a charge unit for a vehicle that can be easily handled and to boost widespread use of vehicles using electricity.

Specifically, as an example of the third technical feature described above, this specification discloses a charge unit for a vehicle including a connector which supplies electric power for charging the vehicle having a battery, an electric power input unit which inputs electric power to be supplied to the connector, a measurement unit which measures electric power that is supplied from the connector to the vehicle, and a communication unit for payment for an electric fee bill based on a result of the measurement by the measurement unit.

In this way, the power supply function and the communication function for payment for the electric fee bill accompanying the power supply are integrated as a unit so that the charge system can easily be established only by installing the charge unit.

In addition, as a detailed example of the third technical feature described above, this specification discloses a configuration in which the communication unit includes a separating/combining unit which separates and combines communication information from and with an electric power line in the charge unit. Thus, only by connecting the charge unit to the electric power line, supplying electric power and payment for an electric fee bill via the power cable communication can be performed. Note that this feature of the present invention of providing the separating/combining unit to the charge unit is useful for various power cable communications with the outside of the charge unit regardless of the communication for payment for an electric fee bill.

In addition, as another detailed example of the third technical feature described above, this specification discloses a configuration in which the communication unit includes a wireless transmission/reception unit which transmits electric power information. If the charge unit is installed in the place where wireless communication is supported, this feature also enables electric power supply and payment for the electric fee bill via the power cable communication only by connecting the charge unit to the electric power line.

In addition, as another detailed example of the third technical feature described above, this specification discloses a configuration in which a charge unit is disposed in a wheel stopper of the vehicle. Thus, a charge system can easily be established by using the wheel stopper that is provided to the parking space. This feature of the present invention is useful also in the case where it is applied to a simplified charge unit without an electric power measurement unit and a communication unit.

In addition, as a further detailed example of the third technical feature described above, this specification discloses a configuration in which at least the connector is disposed in each of the right wheel side and the left wheel side of the wheel stopper. Thus, it is possible to connect the charge cable easily to the wheel stopper portion in both cases having the charge connector on the right side and on the left side of the vehicle.

In addition, as a further detailed example of the third technical feature described above, this specification discloses a configuration for controlling so that electric power is not supplied from the connector on the right wheel side and from the connector on the left wheel side simultaneously. Thus, a state of an unexpected use in which over rating current may flow can be prevented. Note that for this control, it is preferable to provide the power supply switching unit to each of the right wheel side and the left wheel side of the wheel stopper.

The power supply switching unit described above is useful not only for controlling the connectors on the right wheel side and the left wheel side of the wheel stopper described above. In other words, the feature of disposing the power supply switching unit between the connector and the electric power input unit enables to control whether or not to apply voltage to the connector for each of the charge units, which can be a useful measure against theft of electricity or an electric shock.

In addition, as another example of the third technical feature described above, this specification discloses a configuration including a protection unit which protects the connector when it is not used. Thus, even if the charge unit is installed in a place under a severe condition such as an outdoor parking space, it can be protected from rain and wind.

In addition, as a detailed example of the third technical feature described above, this specification discloses a configuration including a detection unit which detects that the protection unit is operated. By this configuration, a state of the protection unit can be monitored and the detection result can be used variously.

For instance, the protection unit is usually operated with intention of using the connector. Therefore, by detecting the operation, communication by the communication unit can be started.

In addition, by deciding that the connector has not been used in a predetermined time after the protection unit, it is known that the protection unit is left in a state unable to function.

Note that the above-mentioned merits of the third technical feature are not limited to the embodiment described above, but the technical concept thereof is to provide a controller which decides that the connector is left in an abnormal state. Therefore, in accordance with this technical concept, various embodiments can be carried out appropriately.

Next, a fourth technical feature disclosed in this specification is related to a fuel consumption measurement system for a vehicle.

As a most general method of measuring fuel consumption of a vehicle, there is known a so-called fill-up method, in which a gasoline tank is filled up before starting the drive, and a drive distance is divided by a refueled amount the next time to fill up, so as to calculate the fuel consumption. On the other hand, it has become a common thing that a vehicle is equipped with a device of calculating instant fuel consumption from a fuel injection amount to the engine and the vehicle speed. Other than that, various fuel consumption measurement systems are proposed in increasing concerns from the viewpoint of economy and consideration to the environment.

Note that there are proposed various methods conventionally about this (see, for example, Patent Documents 3 to 5)

However, there are still many problems that remain to be solved for providing a fuel consumption measurement system that can perform appropriate measurement.

Therefore, this specification discloses a fourth technical feature so as to provide a fuel consumption measurement system for a vehicle that can measure fuel consumption appropriately without imposing a burden on a driver.

Specifically, as an example of the fourth technical feature described above, this specification discloses a fuel consumption measurement system for a vehicle including a fuel tank which receives refueling from a service stand, a reception unit which receives oil supply information to the fuel tank from the service stand, a storage unit which stores oil supply information received by the reception unit, an engine unit which consumes the fuel in the fuel tank so as to provide a travel power, a travel distance information acquisition unit, and a controller which calculates fuel consumption from the oil supply information and the travel distance information. As described above, the oil supply information to the fuel tank is received from the service stand so that the fuel consumption based on the result of the refueling and the result of the drive can be calculated automatically from the received oil supply information and the travel distance information obtained in the vehicle.

In addition, as a specific example of the fourth technical feature described above, this specification discloses a configuration including an electric power accumulation unit which is supplied with electric power from an electric power line in the service stand, in which the reception unit includes a power cable communication unit via the electric power line. In this case, the reception unit can receive information from the service stand when the electric power line is connected for charging the electric power accumulation unit. This feature is useful in a plug-in hybrid vehicle. In addition, as a further specific example of the fourth technical feature described above, this specification discloses a configuration in which the reception unit receives charge amount information from the service stand to the electric power accumulation unit, and the storage unit stores charge amount information received by the reception unit. In addition, as a specific example of the fourth technical feature described above, this specification discloses a configuration in which the reception unit includes a wireless communication unit. This feature is useful not only for a plug-in hybrid vehicle but also for an ordinary gasoline vehicle that receives refueling from the service stand.

In addition, as another specific example of the fourth technical feature described above, this specification discloses a configuration in which the reception unit further receives fuel price information from the service stand, and the storage unit further stores fuel price information received by the reception unit. Thus, not only the fuel consumption but also a bill amount that is actually paid for the refueling and the like is automatically obtained. In addition, drive cost accompanying a variation of the fuel price can be also automatically obtained.

In addition, as another example of the fourth technical feature described above, this specification discloses a fuel consumption measurement system for a vehicle including a fuel tank which receives refueling from a service stand, a storage unit which stores oil supply information, an engine unit which consumes fuel in the fuel tank so as to provide a travel power, a travel distance information acquisition unit, and a controller which calculates fuel consumption automatically from a refueling amount this time and travel distance information from the refueling the last time to the refueling this time both the refueling the last time and the refueling this time to the fuel tank were performed to fill up, on the basis of oil supply information stored in the storage unit, and does not calculate automatically the fuel consumption on the basis of the refueled amount and the travel distance information if at least one of the refueling the last time and the refueling this time to the fuel tank was not performed to fill up. Thus, the fuel consumption can automatically be calculated appropriately on the basis of the storage information of the oil supply information, and meaningless calculation of fuel consumption can be avoided.

In addition, as a specific example of the fourth technical feature described above, this specification discloses a configuration including a reception unit which receives the oil supply information from the service stand in which the storage unit stores the received oil supply information automatically. In addition, it is also possible to receive information whether or not the refueling was performed to fill up, with the reception unit automatically from the service stand. In addition, as another specific example of the fourth technical feature described above, this specification discloses a configuration including an instant fuel consumption meter which calculates instant fuel consumption under driving by detecting fuel supplying state from the fuel tank to the engine unit, in which the controller adopts the fuel consumption based on the instant fuel consumption meter if at least one of the refueling the last time and the refueling this time to the fuel tank was not performed to fill up. Thus, regardless of whether or not the refueling is performed to fill up, the fuel consumption information can be provided on the basis of information that is more appropriate depending on the situation.

In addition, as another example of the fourth technical feature described above, this specification discloses a fuel consumption measurement system for a vehicle including a fuel tank which receives refueling from a service stand, a storage unit which stores oil supply information, an engine unit which consumes fuel in the fuel tank so as to provide a travel power, a travel distance information acquisition unit, and a controller which calculates fuel consumption on the basis of an accumulated refueled amount stored in the storage unit and accumulated travel distance information obtained from the travel distance information acquisition unit if it is decided that an accumulated refueled amount stored in the storage unit is sufficiently larger than a capacity of the fuel tank. Thus, average fuel consumption can be estimated with high reliability on the basis of a result of the refueling. In addition, as a specific example of the fourth technical feature described above, this specification discloses a configuration in which the controller decides that the accumulated refueled amount sufficiently larger than the capacity of the fuel tank if the accumulated refueled amount is larger than a predetermined amount. In addition, as a specific example of the fourth technical feature described above, this specification discloses a configuration in which the controller decides that the accumulated refueled amount is sufficiently larger than the capacity of the fuel tank if the accumulated refueling number of times is larger than a predetermined number of times. In addition, as still another specific example of the fourth technical feature described above, this specification discloses a configuration in which the controller decides that the accumulated refueled amount is sufficiently larger than the capacity of the fuel tank if the accumulated drive distance is larger than a predetermined distance.

In addition, as another specific example of the fourth technical feature described above, this specification discloses a configuration including an instant fuel consumption meter which calculates instant fuel consumption under driving by detecting fuel supply situation from the fuel tank to the engine unit, in which the controller adopts fuel consumption based on the instant fuel consumption meter if it is not decided that the accumulated refueled amount is sufficiently larger than the capacity of the fuel tank. Thus, average fuel consumption can be estimated on the basis of more appropriate information in accordance with the situation regardless of a result of the refueling. The information of the instant fuel consumption meter is appropriate as fuel consumption information of a short period. However, if it has an error, reliability of average fuel consumption estimation of a long period based on the information of the instant fuel consumption meter becomes low. On the other hand, under the circumstance in which the fill-up method cannot be applied, fuel consumption estimation of a short period based on a result of the refueling is not appropriate, but if average is calculated in a long period, the result of the refueling can be regarded as substantially the consumed result so that reliability thereof becomes high. The above-mentioned feature enables to estimate average fuel consumption on the basis of more appropriate information automatically in accordance with the situation so that the above-mentioned two features compensate for each other.

In addition, as another example of the fourth technical feature described above, this specification discloses a fuel consumption measurement system for a vehicle including a fuel tank which receives refueling from a service stand, a storage unit which stores oil supply information, an engine unit which consumes fuel in the fuel tank so as to provide a travel power, a travel distance information acquisition unit, an instant fuel consumption meter which calculates instant fuel consumption under driving by detecting fuel supply situation from the fuel tank to the engine unit, and a controller corrects the instant fuel consumption meter on the basis of the fuel consumption calculated from the accumulated refueled amount stored in the storage unit and the accumulated travel distance information obtained from the travel distance information acquisition unit if it is decided that the accumulated refueled amount stored in the storage unit is sufficiently larger than the capacity of the fuel tank. Thus, an error of the instant fuel consumption meter can be corrected by a result of the refueling and a result of the drive having higher reliability. Specifically, the estimated average fuel consumption calculated on the basis of the result of the refueling and the result of the drive is compared with the estimated average fuel consumption obtained from the instant fuel consumption meter. If a difference between them is larger than a predetermined value, the instant fuel consumption meter is corrected so that the latter estimated average fuel consumption becomes the former estimated average fuel consumption.

In addition, as another example of the fourth technical feature described above, this specification discloses a fuel consumption measurement system for a vehicle including a fuel tank which receives refueling from a service stand, a storage unit which stores oil supply information, an engine unit which consumes fuel in the fuel tank so as to provide a travel power, a travel distance information acquisition unit, an instant fuel consumption meter which calculates instant fuel consumption under driving by detecting fuel supply situation from the fuel tank to the engine unit, and a controller which adopts the fuel consumption based on the instant fuel consumption meter under driving by the engine unit and calculates fuel consumption on the basis of the oil supply information and the travel distance information in the state where the drive by the engine unit is stopped.

Next, a fifth technical feature disclosed in this specification is related to an environment protection system for a vehicle.

There are various proposals for reducing emission of carbon dioxide as environmental measures about driving of vehicles. Further, also from a viewpoint of economy, there is increasing concern about low fuel consumption vehicles. In addition, for reducing environmental load, there is increasing attention to electric vehicles and hybrid vehicles.

Note that there are proposed various methods conventionally about this (see, for example, Patent Documents 6 to 8)

However, there are still many problems that remain to be solved for providing an environment protection system for a vehicle.

Therefore, this specification discloses a fifth technical feature so as to provide an environment protection system for a vehicle that can provide a driver with information of appropriate environmental measures.

Specifically, as an example of the fifth technical feature described above, this specification discloses an environment protection system for a vehicle including a fuel tank which receives refueling, an electric power accumulation unit which receives electric power supplied from an electric power line, a storage unit which stores oil supply information to the fuel tank and charging information to the electric power accumulation unit, a drive power unit which consumes fuel in the fuel tank and electric power in the electric power accumulation unit so as to provide travel power, a travel distance information acquisition unit, and a controller which calculates drive cost from storage unit information and travel distance information. Thus, energy consumption efficiency of a hybrid vehicle driving by different energy sources can be grabbed integrally from a viewpoint of drive cost.

In addition, as a specific example of the fifth technical feature described above, this specification discloses a configuration in which the environment protection system includes a reception unit which receives the oil supply information to the fuel tank and the charging information to the electric power accumulation unit from the service stand. Thus, the information used for drive cost calculation can be obtained automatically. In addition, as another specific example of the fifth technical feature described above, this specification discloses a configuration in which the oil supply information includes oil supply information and refueling price information, and the charging information includes charge amount information and charging price information. Thus, information for drive cost calculation can be obtained in a form that is easily used.

In addition, as another specific example of the fifth technical feature described above, this specification discloses a configuration in which the controller calculates the drive cost if the accumulated drive distance obtained from the travel distance information acquisition unit is larger than a predetermined distance. Strictly, the drive cost is a relationship between a drive distance and energy consumed for driving. According to the above-mentioned feature, the supplied energy is regarded as consumed energy. Therefore, the drive cost is calculated if the accumulated drive distance is larger than a predetermined distance, so as to prevent an inappropriate value from being calculated.

In addition, as another example of the fifth technical feature described above, this specification discloses an environment protection system for a vehicle including a fuel tank which receives refueling, an electric power accumulation unit which receives electric power supplied from an electric power line, a storage unit which stores oil supply information to the fuel tank and charge amount information to the electric power accumulation unit, a drive power unit which consumes fuel in the fuel tank and electric power in the electric power accumulation unit so as to provide travel power, a distance information acquisition unit, conversion unit which converts the oil supply information stored in the storage unit and the charge amount information respectively into carbon dioxide emission amount information, and a controller which calculates carbon dioxide emission amount per unit drive distance from the carbon dioxide emission amount information of the conversion unit and the travel distance information. Thus, load to the environment of a hybrid vehicle that drives by different energy sources is grabbed integrally from a viewpoint of carbon dioxide emission amount.

In addition, as a specific example of the fifth technical feature described above, this specification discloses a configuration including a reception unit which receives the oil supply information to the fuel tank and the charge amount information to the electric power accumulation unit from the service stand. Thus, the information for the carbon dioxide emission amount calculation can be obtained automatically. In addition, as another example of the fifth technical feature described above, this specification discloses a configuration in which the controller calculates the carbon dioxide emission amount per unit drive distance if the accumulated drive distance obtained from the travel distance information acquisition unit is larger than a predetermined distance. Thus, the supplied energy is regarded as the consumed energy that causes carbon dioxide emission. Therefore, the carbon dioxide emission amount is calculated if the accumulated drive distance is larger than a predetermined distance so as to prevent an inappropriate value from being calculated.

In addition, as another example of the fifth technical feature described above, this specification discloses an environment protection system for a vehicle including an energy accumulation unit, a storage unit which stores energy accumulated bill information to the energy accumulation unit, a drive power unit which consumes energy of the energy accumulation unit so as to provide travel power, a travel distance information acquisition unit, a trade information acquisition unit which obtains carbon dioxide emission trade information, and a controller which calculates drive cost from information stored in the storage unit, information of the trade information acquisition unit and the travel distance information. Thus, it is possible to grab drive cost in which the carbon dioxide emission trade is taken into account, and drive cost including cost for reducing environmental load can be grabbed. Note that the above-mentioned energy accumulation unit includes the fuel tank and/or the electric power accumulation unit, specifically. In the above-mentioned configuration, specifically, if the trade information acquisition unit has carbon dioxide emission right sold information, the controller subtracts the sold price from energy accumulation bill stored in the storage unit. If the trade information acquisition unit has carbon dioxide emission right purchased information, the controller adds the purchased price to the energy accumulation bill of the storage unit. In other words, if the carbon dioxide emission right is sold, the drive cost can be reduced although responsibility for the load to the environment by driving increases. On the contrary, if the carbon dioxide emission right is purchased, the drive cost increased although responsibility for the load to the environment is reduced.

In addition, as another example of the fifth technical feature described above, this specification discloses a configuration in which the energy accumulation unit includes a reception unit which receives energy accumulated bill information from the service stand that accumulates energy. Thus, information for calculating drive cost can be obtained automatically. In addition, as another specific example of the fifth technical feature described above, this specification discloses a configuration in which if the accumulated drive distance obtained from the travel distance information acquisition unit is larger than a predetermined distance, the controller calculates the drive cost. In other words, the supplied energy is regarded as the consumed energy. Therefore, if the accumulated drive distance is larger than a predetermined distance, the drive cost is calculated, so as to prevent an inappropriate value from being calculated.

In addition, as another example of the fifth technical feature described above, this specification discloses an environment protection system for a vehicle including an energy accumulation unit, a storage unit which stores energy accumulation amount in the energy accumulation unit, a drive power unit which consumes energy of the energy accumulation unit so as to provide travel power, a travel distance information acquisition unit, a trade information acquisition unit which obtains carbon dioxide emission trade information, a conversion unit which converts energy accumulation amount information stored in the storage unit into carbon dioxide emission amount information, and a controller which calculates carbon dioxide emission amount per unit drive distance from carbon dioxide emission amount information of the conversion unit, the information of the trade information acquisition unit and the travel distance information. Thus, it is possible to grab carbon dioxide emission amount by driving including the carbon dioxide emission trade. Therefore, regardless of an actual carbon dioxide emission amount per drive distance, it is possible to contribute to reduction of load to the environment by the carbon dioxide emission trade. Note that the above-mentioned energy accumulation unit includes, specifically, the fuel tank and/or the electric power accumulation unit. In the above description, specifically, if the trade information acquisition unit has carbon dioxide emission right sold information, the controller adds the amount corresponding to the sold amount is added to the energy accumulation amount stored in the storage unit. If the trade information acquisition unit has carbon dioxide emission right purchased information, the controller subtracts the amount corresponding to the purchased amount from the energy accumulation amount stored in the storage unit. In this way, energy accumulation amount that is apparently increased or decreased by the carbon dioxide emission trade is converted into the carbon dioxide emission amount so that load to the environment including the emission trade can be grabbed.

In addition, as a specific example of the fifth technical feature described above, this specification discloses a configuration in which the energy accumulation unit includes a reception unit which receives energy accumulation amount information from the service stand that accumulates energy. Thus, the information for the carbon dioxide emission amount calculation can be obtained automatically. In addition, as another specific example of the fifth technical feature described above, this specification discloses a configuration in which the controller calculates a carbon dioxide emission amount per unit drive distance if the accumulated drive distance obtained from the travel distance information acquisition unit is larger than a predetermined distance. Thus, the supplied energy is regarded as the consumed energy that causes carbon dioxide emission. Therefore, if the accumulated drive distance is larger than a predetermined distance, the carbon dioxide emission amount is calculated, so as to prevent an inappropriate value from being calculated.

Next, a sixth technical feature disclosed in this specification is related to a vehicle that can run using charged electric power and a charge system for the same.

Recent years, from a viewpoint of reducing carbon dioxide emission as environmental measures and a viewpoint of economy, there is increasing attention to electric vehicles and hybrid vehicles. Further, there is also increasing concern about a plug-in hybrid vehicle that uses not only gasoline but also charged electric power as energy source.

Note that there are proposed various methods conventionally about this (see, for example, Patent Documents 9 and 10).

However, there are still many problems that remain to be solved for wide-spread use of vehicles that can run using charged electric power, because of problems about setting up of the charging environment and the like.

Therefore, this specification discloses a sixth technical feature so as to provide practical improvement of a vehicle that can run using charged electric power and a charge system for the same.

Specifically, as an example of the sixth technical feature described above, this specification discloses a vehicle that can run using charged electric power including a fuel tank which receives refueling, an electric power accumulation unit which receives electric power supplied from an electric power line, a refueling preparation detection unit which detects a preparation state for fueling the fuel tank, an electric power supplying preparation detection unit which detects a preparation state for supplying electric power to the electric power accumulation unit, and a controller which changes the electric power supplying situation to the electric power accumulation unit when the electric power supplying preparation detection unit detects the preparation state for supplying electric power in accordance with whether or not the refueling preparation detection unit detects the refueling preparation state. An example of changing the electric power supplying situation is that when the refueling preparation detection unit detects the refueling preparation state, even if the electric power supplying preparation detection unit detects the electric power supplying preparation state, it is controlled not to supply electric power to the electric power accumulation unit. This feature is useful, for example, in the case where the vehicle is under a predetermined electric power supplying contract such as a late night electric fee bill contract based on the premise of charging in the house, even if the electric power supplying preparation detection unit detects the electric power supplying preparation state in the service stand or the like, electric power supply to the electric power accumulation unit is not performed, so as not to receive expensive electric power supply. The case where the electric power supplying situation is changed is not limited to the above-mentioned example. Note that it is possible to adopt a configuration in which in the case of emergency, in the service stand or the like, responding to an operation of the operation unit, even if the refueling preparation detection unit detects the refueling preparation state, electric power supply to the electric power accumulation unit is enabled when the electric power supplying preparation detection unit detects the preparation state for supplying electric power.

In addition, as another example of the sixth technical feature described above, this specification discloses a vehicle that can run using charged electric power including a fuel tank which receives refueling, an electric power accumulation unit which receives electric power supplied from an electric power line, an electric power supplying preparation detection unit which detects a preparation state for supplying electric power to the electric power accumulation unit, and a controller that changes the electric power supplying situation to the electric power accumulation unit hen the electric power supplying preparation detection unit detects the preparation state for supplying electric power, in accordance with whether or not the vehicle is under a predetermined electric power supplying contract. An example of changing the electric power supplying situation is that when the vehicle is under a predetermined electric power supplying contract, even if the electric power supplying preparation detection unit detects the electric power supplying preparation state, it is controlled not to perform electric power supply to the electric power accumulation unit. This feature is useful, for example, in the case where the vehicle is under a predetermined electric power supplying contract, and it is not the time slot when the electric power supply based on the contract can be performed, even if the electric power supplying preparation detection unit detects the electric power supplying preparation state, the electric power supply to the electric power accumulation unit is not performed, so as not to receive expensive electric power supply. The case of changing the electric power supplying situation is not limited to the above-mentioned example.

In addition, as another example of the sixth technical feature described above, this specification discloses a vehicle that can run using charged electric power including an electric power accumulation unit which receives electric power supplied from an electric power line, an electric power supplying preparation detection unit which detects a preparation state for supplying electric power to the electric power accumulation unit, a drive start operation unit, and a drive controller which disables an operation of the drive start operation unit when the electric power supplying preparation detection unit detects the electric power supplying preparation state. An example of the detection of the electric power supplying preparation state is a detection of a state where an external cable for supplying electric power to the electric power accumulation unit is left connected to the vehicle, and driving in this state can be prevented. A case of the detection of the electric power supplying preparation state is not limited to the above-mentioned example. In addition, it is possible to provide an alarm unit which alarms that the drive controller has disabled an operation of the drive start operation unit, so as to invite to cancel the electric power supplying preparation state for enabling to drive. This configuration is useful in the case where the vehicle is under a predetermined electric power supplying contract, and it is not the time slot when the electric power supply based on the contract can be performed, even if the electric power supplying preparation detection unit detects the electric power supplying preparation state, a controller is provided that controls not to perform the electric power supply to the electric power accumulation unit. In this configuration, for example, if the vehicle is parked in the garage of the house and the electric power supplying preparation state is set so that the charging start automatically in late night, it is possible to prevent an accident the next morning such that the vehicle is driven without canceling the electric power supplying preparation state. Note that the above-mentioned feature is useful regardless that the vehicle is a plug-in hybrid vehicle or an electric vehicle.

In addition, as another example of the sixth technical feature described above, this specification discloses a vehicle that can run using charged electric power including an electric power accumulation unit which receives electric power supplied from an electric power line, an electric power supplying preparation detection unit which detects a preparation state for supplying electric power to the electric power accumulation unit, a time slot detection unit which continues detection whether or not it is the time slot when the vehicle can be supplied with electric power on the basis of a predetermined electric power supplying contract when the electric power supplying preparation detection unit detects the electric power supplying preparation state, and a controller which does not perform the electric power supply even if the electric power supplying preparation detection unit detects the electric power supplying preparation state unless the time slot detection unit detects it is the time slot when the electric power supply can be performed. In this way, if there is a predetermined electric power supplying contract, the detection of the electric power supplying preparation state and the detection of the time slot when the electric power supply can be performed are associated with each other.

In addition, as another example of the sixth technical feature described above, this specification discloses a vehicle that can run using charged electric power including a fuel tank which receives refueling, an electric power accumulation unit which receives electric power supplied from an electric power line, a detection unit which detects an electric power accumulated state, a first power source which consumes fuel in the fuel tank so as to generate drive power, a second power source which consumes electric power in the electric power accumulation unit so as to generate drive power, and a controller which is capable of selecting between a first mode in which switching from the second power source to the first power source is performed on the basis of a first detection level of the detection unit and a second mode in which switching from the second power source to the first power source on the basis of a second detection level of the detection unit that is different from the first detection level. The second detection level is, for example, a level for sustaining the state where the electric power accumulation unit is sufficiently charged, and the first detection level is, for example, a level that the second power source can be used for the drive when drive efficiency of the drive using a first power source is a predetermined value or lower. In addition, it is possible that the controller has a configuration of selecting a third mode in which only the second power source is used for continuous drive. In this case, it is possible to adopt a configuration in which the controller can switch from the second mode to the third mode, so as to enter the drive state using only the second power source from the state where the electric power accumulation unit is sufficiently charged. In addition, it is also possible to adopt a configuration where the controller enables to change from the second mode to the first mode. In this case, too, it is possible to enter the first mode from the state where the electric power accumulation unit is sufficiently charged. Note that it is preferable to adopt a configuration in which the controller can further switch between the first power source and the second power source on the basis of drive efficiency.

In addition, as another example of the sixth technical feature described above, this specification discloses a charge system for a vehicle that can run using charged electric power, including a fuel supply channel, an electric power supply channel, an abnormal detection unit which detects an abnormal state of the electric power supply channel, a controller which disables fuel supply from the fuel supply channel when the abnormal detection unit detects an abnormal state of the electric power supply channel. According to this feature, when electric power and fuel are supplied at the same time in a service stand or the like, it is possible to prevent a flame caused by a spark due to the abnormal state of the electric power supply channel.

As described above, according to the sixth technical feature, various practical improvements in a vehicle that can run using charged electric power and a charge system for the same can be performed.

INDUSTRIAL APPLICABILITY

The present invention provides a practical plug-in hybrid vehicle or electric vehicle, and a charge system, a fuel consumption measurement system, and an environment protection system for the vehicle.

The invention claimed is:

1. A vehicle comprising:
   an electric power accumulation unit;
   a charging channel which is connected to an external power supply unit and leads electric power to the electric power accumulation unit;
   a power supply preparation detection unit which detects a power supply preparation state to the electric power accumulation unit via the charging channel;
   a drive start operation unit; and
   a drive controller which disables an operation of the drive start operation unit when the power supply preparation detection unit detects the power supply preparation state.

2. A vehicle according to claim 1 further comprising a power cable communication unit which performs power cable communication externally about the charging via the charging channel.

3. A vehicle according to claim 1, wherein the power supply preparation state is that the charging channel is connected to the external power supply.

4. A vehicle according to claim 3, wherein the drive controller disables the drive start operation so as to prevent the vehicle from starting with the charging channel left in connection to the external power supply.

5. A vehicle comprising:
   an electric power accumulation unit;
   a charging channel which is connected to an external power supply unit and leads electric power to the electric power accumulation unit;
   a fuel tank which receives refueling from the outside:
   a detection unit which detects an electric power accumulated state of the electric power accumulation unit;
   a first power source which consumes fuel in the fuel tank so as to generate drive power,
   a second power source which consumes electric power in the electric power accumulation unit so as to generate drive power; and
   a controller which is capable of selecting between a first mode in which switching from the second power source to the first power source is performed on the basis of a first detection level of the detection unit and a second mode in which switching from the second power source to the first power source is performed on the basis of a second detection level of the detection unit that is different from the first detection level.

6. A vehicle according to claim 5, wherein the second detection level is a level for sustaining the state where the electric power accumulation unit is sufficiently charged, and the first detection level is a level that the second power source can be used for the drive when drive efficiency of the drive using a first power source is a predetermined value or lower.

7. A vehicle according to claim 5 further comprising a power cable communication unit which performs power cable communication externally about the charging via the charging channel.

8. A vehicle comprising:
a fuel tank which receives refueling from the outside;
a storage unit which stores fuel supply information to the fuel tank;
a power source which consumes fuel in the fuel tank so as to provide travel power;
a travel distance information acquisition unit; and
a controller which calculates fuel consumption automatically on the basis of the fuel supply information stored in the storage unit and travel distance information in the travel distance acquisition unit,
wherein the controller calculates the fuel consumption automatically from a refueling amount this time and travel distance information from refueling the last time to refueling this time on the fuel supply information stored in the storage unit if both the refueling the last time and the refueling this time to the fuel tank were performed to fill up, and the controller does not calculate the fuel consumption automatically on the basis of the refueled amount and the travel distance information if at least one of the refueling the last time and the refueling this time to the fuel tank is not performed to fill up.

9. A vehicle comprising:
a fuel tank which receives refueling from the outside;
a storage unit which stores fuel supply information to the fuel tank;
a power source which consumes fuel in the fuel tank so as to provide travel power;
a travel distance information acquisition unit; and
a controller which calculates fuel consumption automatically on the basis of the fuel supply information stored in the storage unit and travel distance information in the travel distance acquisition unit;
wherein the controller calculates the fuel consumption on the basis of an accumulated refueled amount stored in the storage unit and accumulated travel distance information obtained from the travel distance information acquisition unit, if it is decided that the accumulated refueled amount stored in the storage unit is sufficiently larger than the capacity of the fuel tank.

10. A vehicle comprising:
a fuel tank which receives refueling from the outside;
a storage unit which stores fuel supply information to the fuel tank;
a power source which consumes fuel in the fuel tank so as to provide travel power;
a travel distance information acquisition unit; and
a controller which calculates fuel consumption automatically on the basis of the fuel supply information stored in the storage unit and travel distance information in the travel distance acquisition unit;
an instant fuel consumption meter which calculates instant fuel consumption under driving by detecting fuel supply situation from the fuel tank to the engine unit; and
a correction unit which corrects the instant fuel consumption meter on the basis of the fuel consumption calculated by the controller.

11. A vehicle according to claim 10, wherein the correction unit corrects the instant fuel consumption meter so as to calibrate the instant fuel consumption meter with the actual fuel consumption calculated on the basis of the fuel supply information and the travel distance information.

* * * * *